(12) United States Patent
Hirai

(10) Patent No.: US 9,094,544 B2
(45) Date of Patent: Jul. 28, 2015

(54) INFORMATION PROCESSING APPARATUS, INFORMATION PROCESSING METHOD, AND STORAGE MEDIUM

(75) Inventor: Nobuyuki Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1335 days.

(21) Appl. No.: 12/033,810

(22) Filed: Feb. 19, 2008

(65) Prior Publication Data

US 2008/0259387 A1    Oct. 23, 2008

(30) Foreign Application Priority Data

Apr. 19, 2007   (JP) ................................. 2007-110955

(51) Int. Cl.
| | |
|---|---|
| G06F 15/00 | (2006.01) |
| H04N 1/00 | (2006.01) |
| G06F 3/12 | (2006.01) |

(52) U.S. Cl.
CPC .......... *H04N 1/00222* (2013.01); *G06F 3/1203* (2013.01); *G06F 3/1243* (2013.01); *G06F 3/1288* (2013.01)

(58) Field of Classification Search
USPC ............. 358/1.15, 1.18, 1.12, 1.13, 1.14, 1.9, 358/1.16, 3.29, 296, 405, 407; 715/525; 710/7, 8, 15, 19, 44, 36, 65, 72, 115; 399/16, 79, 80, 81, 82, 83, 87; 713/168, 182, 187
See application file for complete search history.

(56) References Cited

U.S. PATENT DOCUMENTS

| | | | | |
|---|---|---|---|---|
| 5,361,393 | A * | 11/1994 | Rossillo ............................. | 713/1 |
| 5,459,818 | A * | 10/1995 | Grant et al. ................... | 358/1.15 |
| 6,441,919 | B1 * | 8/2002 | Parker et al. .................. | 358/1.18 |
| 6,952,801 | B2 * | 10/2005 | Warmus et al. ............... | 715/251 |
| 7,345,781 | B2 * | 3/2008 | Beckman et al. ............ | 358/1.15 |
| 2003/0159114 | A1* | 8/2003 | Nishikawa et al. ........... | 715/530 |
| 2005/0044494 | A1* | 2/2005 | Barnes et al. ................. | 715/531 |
| 2005/0052686 | A1* | 3/2005 | Maruyama .................... | 358/1.15 |
| 2005/0094206 | A1* | 5/2005 | Tonisson ....................... | 358/1.18 |
| 2005/0125728 | A1* | 6/2005 | Peiro et al. .................... | 715/523 |
| 2005/0162676 | A1* | 7/2005 | Aoki ............................. | 358/1.13 |
| 2006/0187488 | A1* | 8/2006 | Sakamoto .................... | 358/1.18 |

FOREIGN PATENT DOCUMENTS

JP           2003-296070 A     10/2003

* cited by examiner

*Primary Examiner* — Allen H Nguyen
(74) *Attorney, Agent, or Firm* — Canon U.S.A., Inc. IP Division

(57) ABSTRACT

An information processing apparatus includes an analysis unit configured to analyze a print job generated based on a plurality of records, a determination unit configured to detect a boundary or boundaries of records based on a result of analysis obtained by the analysis unit and to determine a print page corresponding to each respective record, and a storage unit configured to store each record of the print job and a respective print page corresponding to each respective record while associating them with each other according to content determined by the determination unit. Related methods are also disclosed.

9 Claims, 24 Drawing Sheets

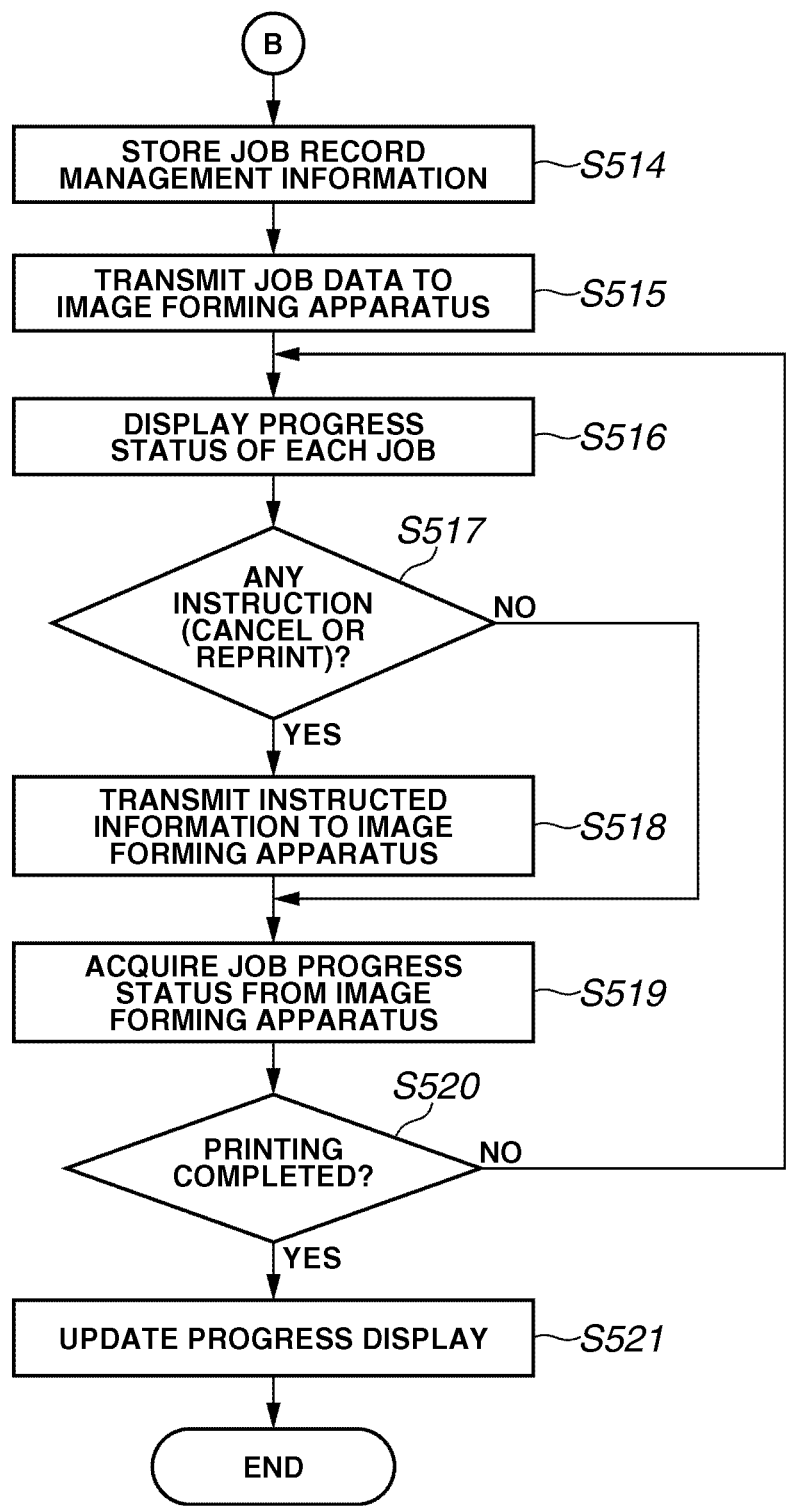

FIG.7A

```
<?xml version="1.0" encoding="utf-8"?>
<PPML>
<DOCUMENT_SET>
<REUSABLE_OBJECT>
    REUSABLE DATA A
    REUSABLE DATA B
    REUSABLE DATA C
</REUSABLE_OBJECT>
<DOCUMENT>
<PAGE>
    REUSABLE_OBJECT  REFER TO REUSABLE DATA A
    VARIABLE DATA A1
</PAGE>
<PAGE>
    REUSABLE_OBJECT  REFER TO REUSABLE DATA B
    VARIABLE DATA B1
</PAGE>
<PAGE>
    REUSABLE_OBJECT  REFER TO REUSABLE DATA C
</PAGE>
<PAGE>
    REUSABLE_OBJECT  REFER TO REUSABLE DATA A
    VARIABLE DATA A2
</PAGE>
<PAGE>
    REUSABLE_OBJECT  REFER TO REUSABLE DATA B
    VARIABLE DATA B2
</PAGE>
<PAGE>
    REUSABLE_OBJECT  REFER TO REUSABLE DATA C
</PAGE>
     ⋮
</DOCUMENT>
</DOCUMENT_SET>
</PPML>
```

FIG.7B

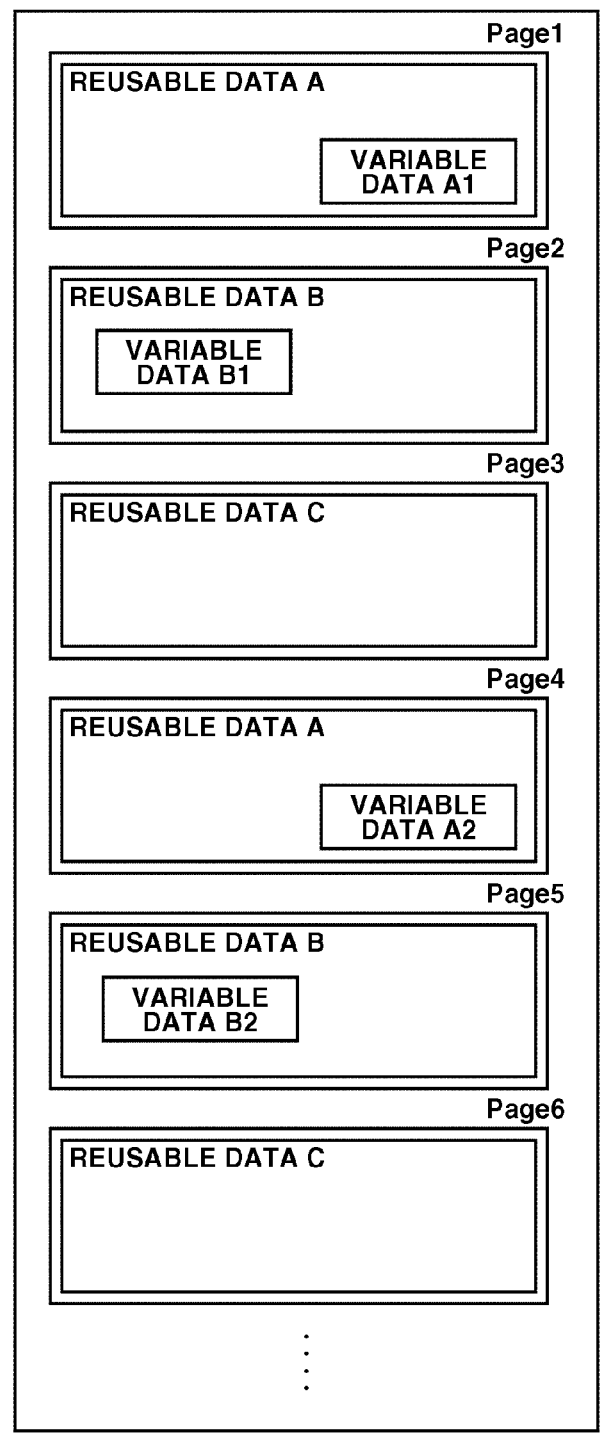

FIG.8A

```
<?xml version="1.0" encoding="utf-8"?>
<PPML>
<DOCUMENT_SET>
<REUSABLE_OBJECT>
    REUSABLE DATA A
</REUSABLE_OBJECT>
<DOCUMENT>
<PAGE>
    REUSABLE_OBJECT  REFER TO REUSABLE DATA A
    VARIABLE DATA X1
</PAGE>
<PAGE>
    REUSABLE_OBJECT  REFER TO REUSABLE DATA A
    VARIABLE DATA Y1
</PAGE>
<PAGE>
    REUSABLE_OBJECT  REFER TO REUSABLE DATA A
    VARIABLE DATA X2
</PAGE>
<PAGE>
    REUSABLE_OBJECT  REFER TO REUSABLE DATA A
    VARIABLE DATA Y2
</PAGE>
<PAGE>
    REUSABLE_OBJECT  REFER TO REUSABLE DATA A
    VARIABLE DATA X3
</PAGE>
<PAGE>
    REUSABLE_OBJECT  REFER TO REUSABLE DATA A
    VARIABLE DATA Y3
</PAGE>
    :
    :
</DOCUMENT>
</DOCUMENT_SET>
</PPML>
```

FIG.8B

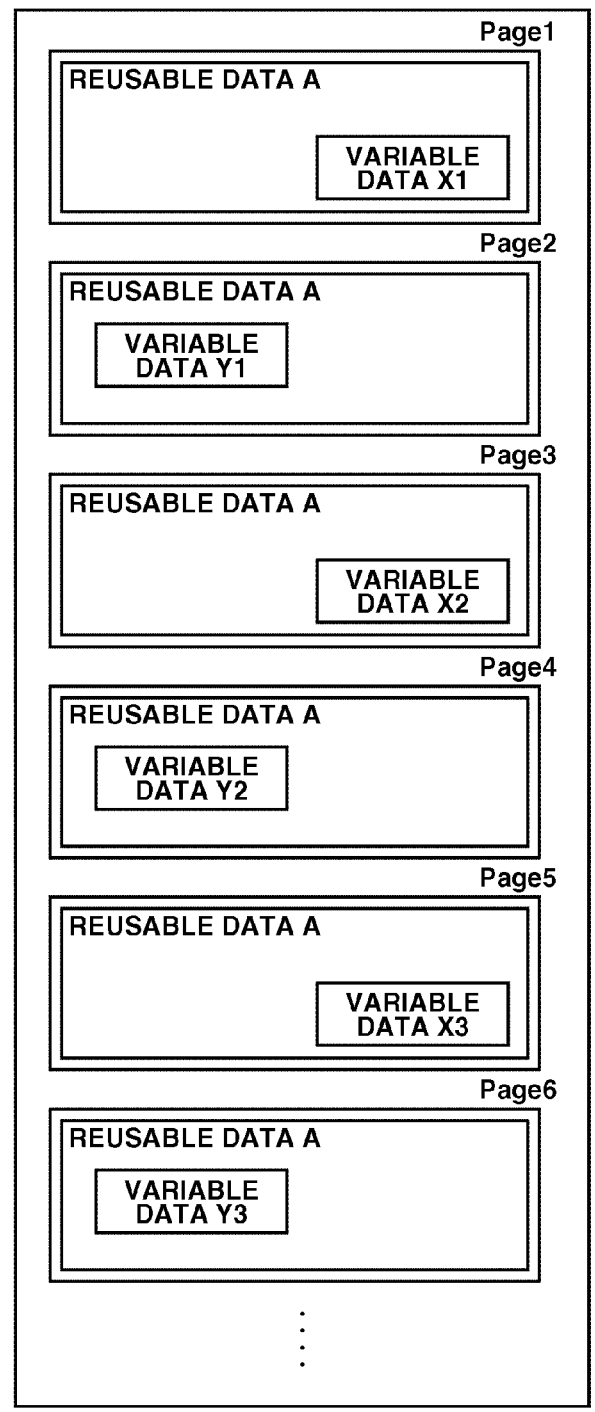

FIG.11

| JOB MANAGEMENT APPLICATION | | | | |
|---|---|---|---|---|
| JOB | DISPLAY | WINDOW | TOOL | HELP |

TRANSMISSION JOB

| JOB NAME | STATE | | OUTPUT PRINTER | NUMBER OF PAGES |
|---|---|---|---|---|
| JOB A | PRINTING IN PROGRESS | | PRINTER A | 15 |
| RECORD 1 | PRINTING COMPLETED | (VARIABLE DATA A1, VARIABLE DATA B1) | | 3 |
| RECORD 2 | PRINTING COMPLETED | (VARIABLE DATA A2, VARIABLE DATA B2) | | 3 |
| RECORD 3 | PRINTING IN PROGRESS | (VARIABLE DATA A3, VARIABLE DATA B3) | | 3 |
| RECORD 4 | WAITING FOR PRINTING | (VARIABLE DATA A4, VARIABLE DATA B4) | | 3 |
| RECORD 5 | WAITING FOR PRINTING | (VARIABLE DATA A5, VARIABLE DATA B5) | | 3 |

FIG.12

| JOB MANAGEMENT APPLICATION | | | |
|---|---|---|---|
| JOB　DISPLAY　WINDOW　TOOL　HELP | | | |
| TRANSMISSION COMPLETED JOB | | | |
| JOB NAME | RESULT | OUTPUT PRINTER | NUMBER OF PAGES |
| JOB B | CANCEL | PRINTER A | 500 |
| JOB A | PRINTING COMPLETED | PRINTER A | 15 |
| DOCUMENT C | ERROR | PRINTER A | 200 |
| RECORDS 1 TO 19 | PRINTING COMPLETED | | 38 |
| RECORD 20 | ERROR | (VARIABLE DATA X20, VARIABLE DATA Y20) | 2 |
| RECORDS 21 TO 100 | NOT YET PRINTED | | 160 |

1201　1202　1203　1204

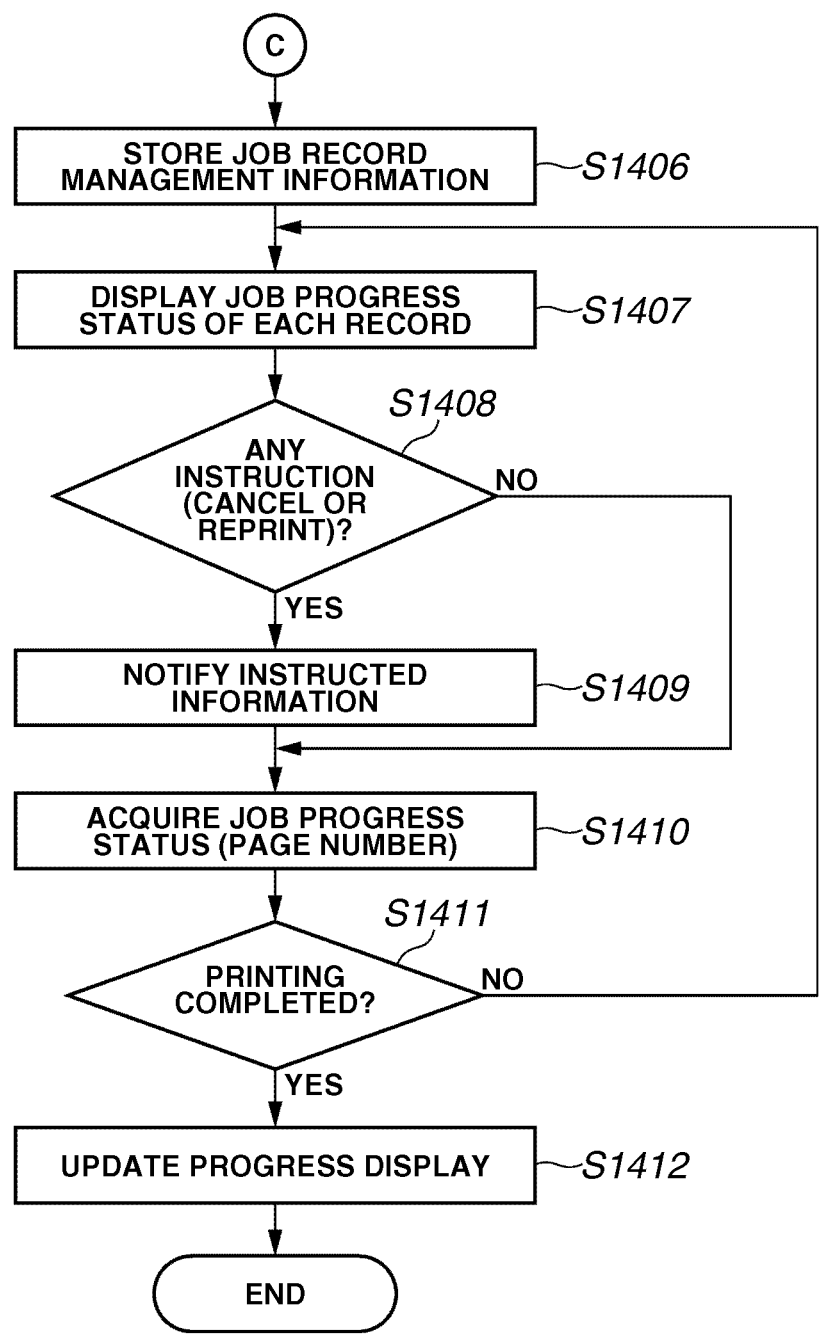

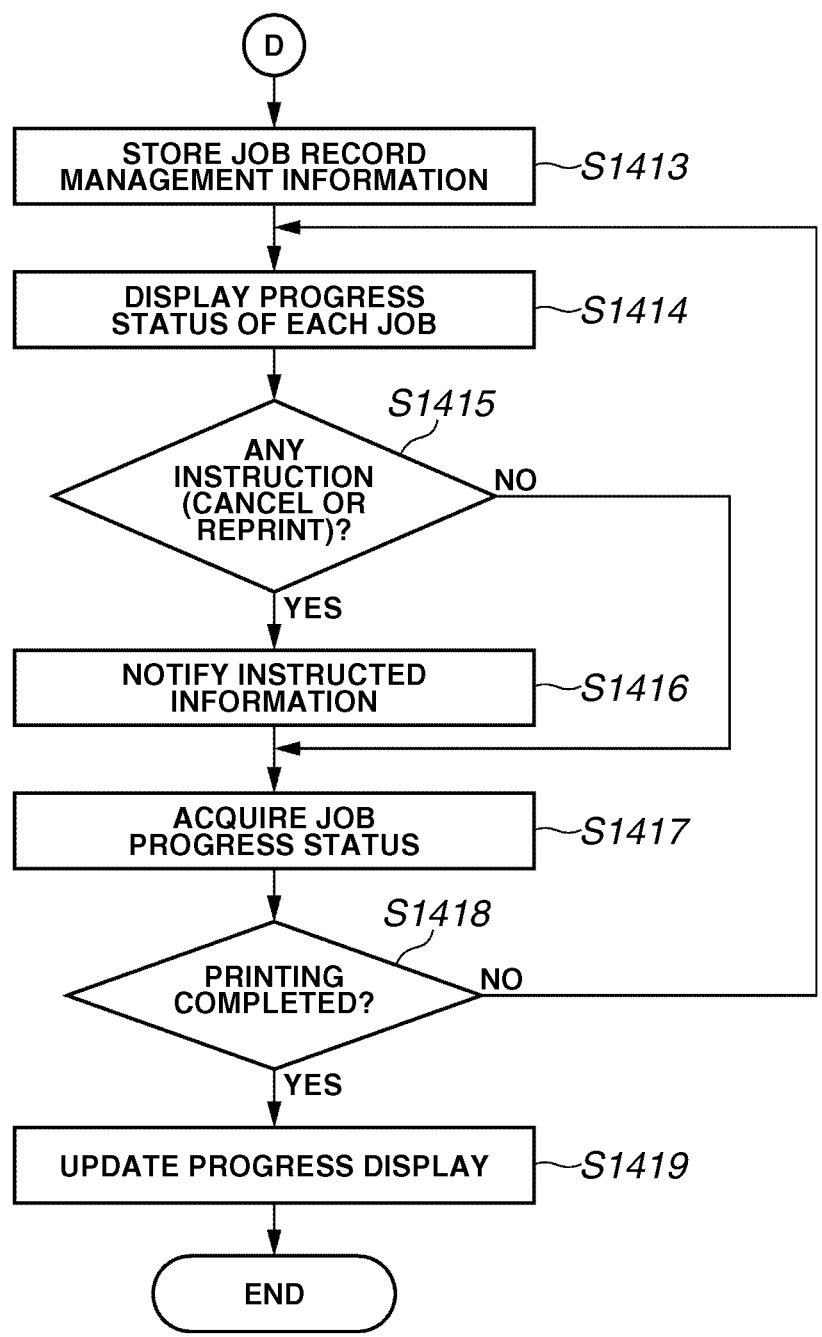

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, a method for controlling an information processing apparatus, and a storage medium storing a program. More particularly, the present invention relates to a job management system capable of realizing variable print processing.

2. Description of the Related Art

As discussed in Japanese Patent Application Laid-Open No. 2003-296070, variable print processing includes reading variable data from a database, inserting the read data into predetermined areas of a template, and outputting a print product having content partly differentiated for each product.

In a first conventional printing method, a host computer combines a template with variable data and generates print data similar to ordinary print data. However, according to this method, the host computer repetitively transmits the same drawing content as part of page data. Thus, the host computer is required to process a great amount of data.

There is a second conventional printing method which defines a reusable object, such as Personalized Print Markup Language (PPML), and uses a data format capable of designating a reusable object as data of each page. For this method, a printer controller performs raster image processor (RIP) processing on a reusable object beforehand and starts print processing while performing RIP processing on data of each page.

The second conventional printing method can reduce a total amount of data transmitted from a host computer to the printer controller and can use the RIP processed data as cache data. Therefore, for the purpose of reducing a processing time, it is desirable to use PPML description language as the data format of the second conventional printing method.

In general, it is difficult to identify breakpoints of records in print jobs generated by variable print processing. The records typically are a series of print units of variable data. For example, in a variable print for processing a print job for a plurality of clients, the variable data of one client may be one record.

As another example, when job management is performed for a print job relating to variable prints for 10 people, personal data for 10 people (which may be 10 records) can be managed as one print job. Namely, if each record requires a print product composed of three sheets, the total number of pages for the print job (including the 10 records) is 30 pages. Thus, the print processing status of a single job including 30 pages to be printed is managed.

In this case, an operator can recognize the page number of a page currently being printed (e.g., the 10th page) according to the status of print processing. However, it is not easy to identify the number of records whose printing has been completed.

For example, an operator may request a reprint if printing of the 11th page failed or the quality of a print product deteriorates. In such cases, a variable print application cannot identify a page (such as a target record) to be reprinted.

According to the variable print discussed in Japanese Patent Application Laid-Open No. 2003-296070, if it is determined that division of a variable job is required based on print settings, a bookbinding application generates a job on a record-by-record basis.

However, if the technique discussed in Japanese Patent Application Laid-Open No. 2003-296070 is used, the bookbinding application may output all records as one print job according to designated print settings. In particular, the technique discussed in Japanese Patent Application Laid-Open No. 2003-296070 cannot manage the status of print processing on a record-by-record basis.

Thus, it would be desirable to realize a record-by-record basis management for a print job relating to a variable print.

SUMMARY OF THE INVENTION

Exemplary embodiments of the present invention are directed to an image processing technique capable of realizing a record-by-record basis management for a print job relating to a variable print.

According to an aspect of the present invention, an information processing apparatus includes an analysis unit configured to analyze a print job generated based on a plurality of records, a determination unit configured to detect at least one boundary of records based on a result of analysis obtained by the analysis unit and to determine a respective print page corresponding to each respective record, and a storage unit configured to store each record and its respective print page while associating them with each other according to content determined by the determination unit. Other aspects of the present invention include related methods and also include computer-executable instructions embodied on a machine readable device or devices.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5C is a flowchart illustrating the continuation of an example of an operation performed by the job management application according to the first exemplary embodiment of the present invention.

FIGS. 7A and 7B illustrate an example of PPML files.

FIGS. 8A and 8B illustrate another example of PPML files.

FIG. 11 illustrates an example of a record display according to the first exemplary embodiment of the present invention.

FIG. 12 illustrates another example of a record display according to the first exemplary embodiment of the present invention.

FIG. 14B is a flowchart illustrating a continuation of an example of an operation performed by the job management application according to the second exemplary embodiment of the present invention.

FIG. 14C is a flowchart illustrating a continuation of an example of an operation performed by the job management application according to the second exemplary embodiment of the present invention.

DETAILED DESCRIPTION OF THE EMBODIMENTS

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, when a reference mark appears in more than one figure, it refers to the same type of item in those figures. Once an item is described with respect to one figure, it may not be described further with respect to other figures that include such item where such discussion would be redundant. Exemplary embodiments are described in detail below with reference to the drawings.

Figure 1:
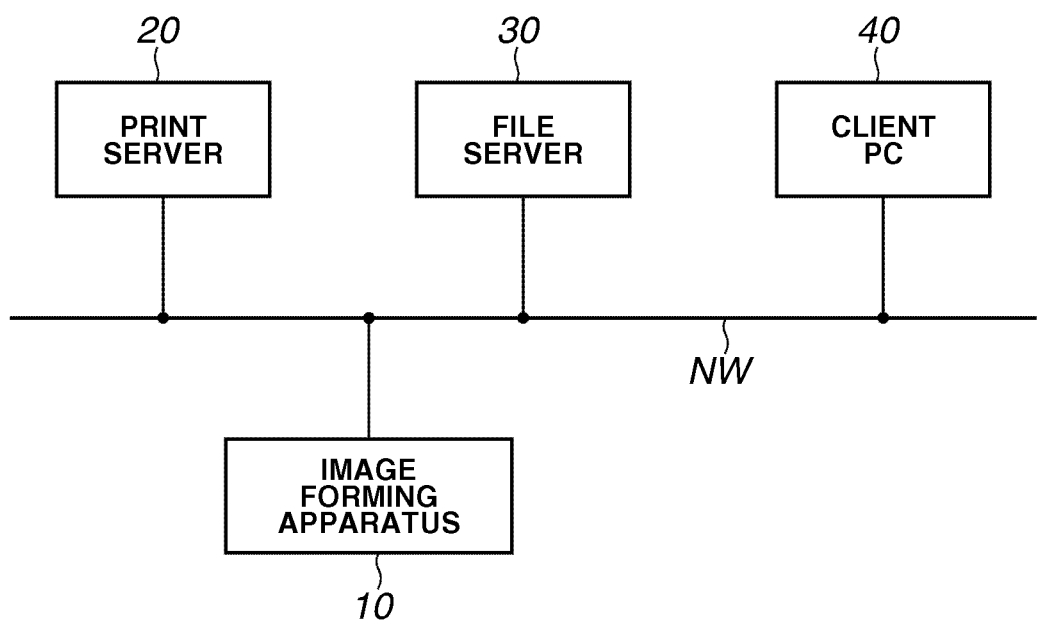
FIG. 1 illustrates an example of a configuration of an image forming system according to an exemplary embodiment of the present invention.

FIG. 1 illustrates a fundamental arrangement of an image forming system according to an exemplary embodiment of the present invention. The image forming system includes an image forming apparatus 10, a print server 20, a file server 30, and a client personal computer (PC) 40 that can communicate with each other via a network NW. The image forming system is programmed in accordance with the present invention as described in detail below.

The image forming apparatus 10 has various functions (including scan, print, and copy functions). The print server 20 manages print jobs and the image forming apparatus 10 connected via the network NW. The print server 20 can monitor the status of each image forming apparatus and each print job. The print server 20 can perform various control operations including temporary stoppage of a print job, change of settings, and restart of print processing, as well as copy, move, and deletion of a job. In the exemplary embodiment, the image forming system is programmed in accordance with the present invention. For example, in a first exemplary embodiment described in further detail below, the programming is implemented using a software program installed on the print server 20. As another example, in a second exemplary embodiment described in further detail below, the programming is implemented by a software program installed on the image forming apparatus 10. The programming in accordance with the present invention can alternatively be installed on the file server 30 and/or the client PC 40 in accordance with the present invention.

The file server 30 serves as a database storing variable data usable for a variable print. For example, the file server 30 serves as a client database that stores client data, such as address, name, and other destination data. The client PC 40 has various functions including editing of an application file and providing a print instruction for the application file. The client PC 40 can assist the print server 20 that manages the image forming apparatus 10 and monitors and controls print jobs. The client PC 40 enables an operator to confirm the status of each job.

Figure 2:
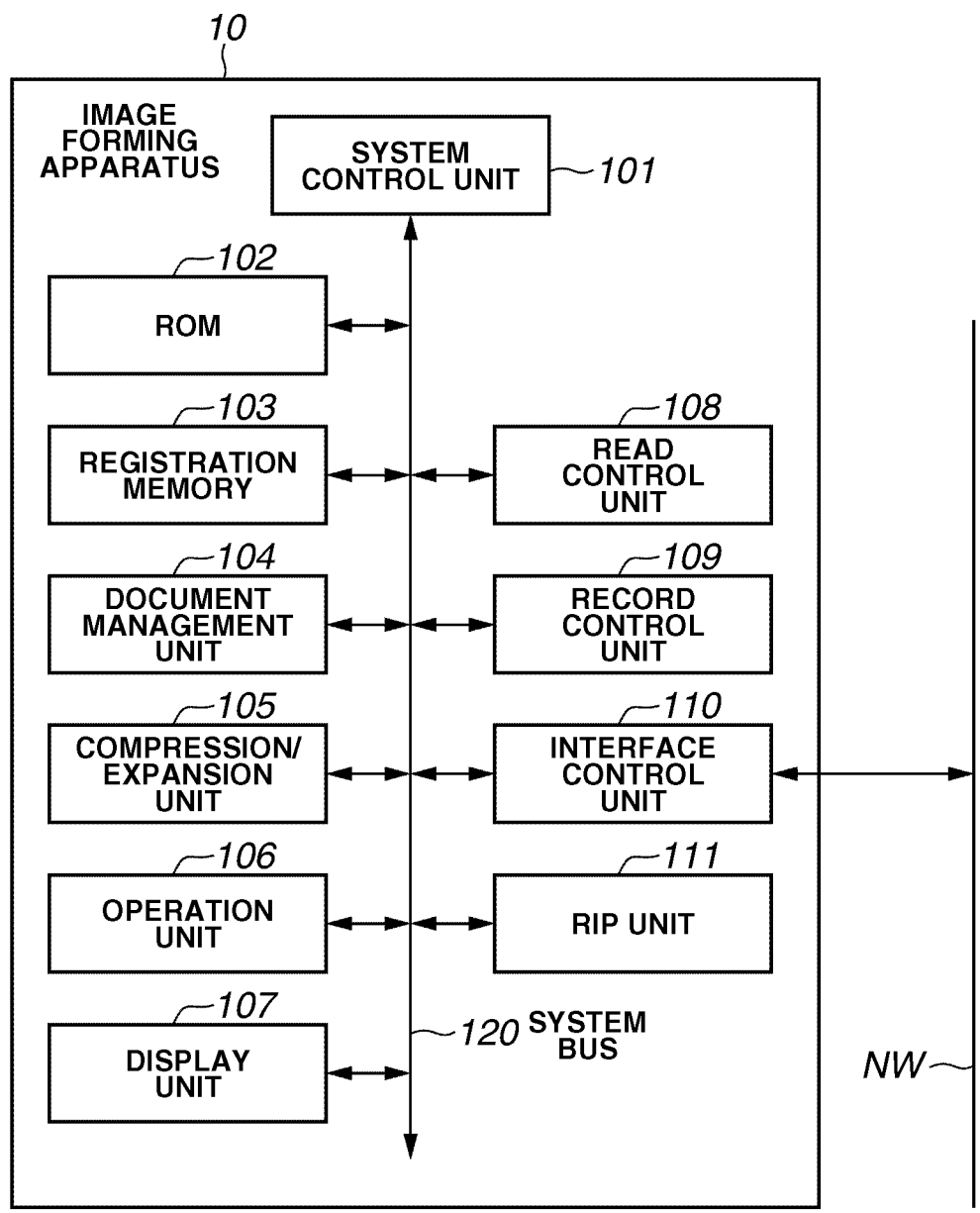
FIG. 2 illustrates an example of a configuration of an image forming apparatus according to an exemplary embodiment of the present invention.

FIG. 2 is a block diagram illustrating a fundamental configuration of the image forming apparatus 10. A system control unit 101 controls functional units connected via a system bus 120 to perform overall control of the image forming apparatus 10. A read only memory (ROM) 102 stores control programs of the system control unit 101. A registration memory 103 stores setting values registered by an operator and management data of the image forming apparatus 10. The registration memory 103 can be, for example, a battery backup static random access memory (SRAM) or a flash memory.

A document management unit 104 can store numerous image data, job data, and job management information. For example, the document management unit 104 stores image data received via a read control unit 108, image data received from the print server 20 via the network NW and an interface control unit 110, and job data. The document management unit 104 can be, for example, a hard disk.

A compression/expansion unit 105 performs compression/expansion processing on image data. The compression/expansion unit 105 compresses image data, if necessary, in a process of storing the image data into the document management unit 104 and expands (decompresses) compressed image data in a process of reading the compressed image data out of the document management unit 104.

Furthermore, if the image forming apparatus 10 receives Joint Photographic Experts Group (JPEG) or Joint Bi-level Image experts Group (JBIG) compressed data via the network NW, the compression/expansion unit 105 decompresses (expands) the received compression data.

An operation unit 106 enables an operator to perform various input operations with various keys provided thereon. A display unit 107 includes a display device, such as a liquid crystal display (LCD) or a light emitting diode (LED), that can realize a screen display of various image/text data. The display unit 107 can be configured to display a preview image based on the data stored in the document management unit 104, so that an operator can confirm a print image beforehand prior to execution of print processing. The display unit 107 not only performs various displays but also generates sound.

The read control unit 108 includes an image sensor (e.g., a charge coupled device (CCD)) and an image processing control unit. The read control unit 108 optically reads a document and converts a read image into electric data. Furthermore, the read control unit 108 performs various processing (for example, color processing, binarization processing, and halftone processing) on image data and outputs processed image data. The read control unit 108 is operable for an automatic document feeder (ADF) type that can read document sheets successively conveyed from an automatic document feeder or a document platen type that can read a stationary document placed on a document positioning glass plate.

A record control unit 109 includes a printer (e.g., a laser printer or an inkjet printer). The record control unit 109 performs various image processing (for example, smoothing processing and recording density correction processing) on image data to be recorded, and outputs (prints) the processed image data on a recording medium.

The interface control unit 110 enables the information processing apparatus 10 to communicate with the print server 20 or other information processing apparatuses connected via the network NW (e.g., Local Area Network (LAN) or Universal Serial Bus (USB)), to perform transmission/reception of image data or device information according to a communication control method.

A raster image processor (RIP) unit 111 performs raster image processor (RIP) processing on Page Description Language (PDL) data received via the interface control unit 110. If necessary, intermediate data of the image data produced during the RIP processing and print ready data (for example, bitmapped data for a print or compressed data of the bitmapped data) can be stored in the document management unit 104.

Figure 3:
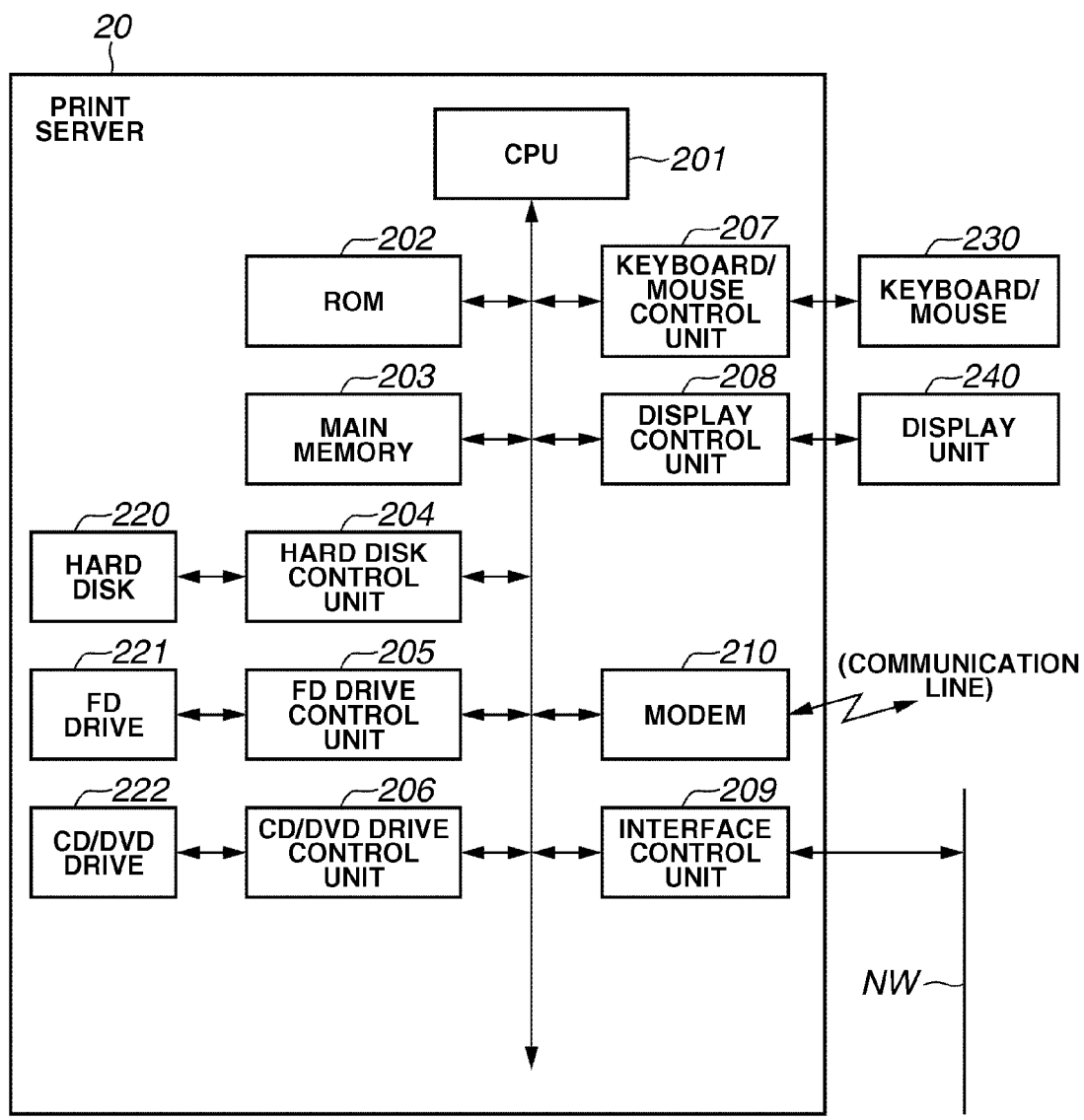
FIG. 3 illustrates an example of a configuration of a print server according to an exemplary embodiment of the present invention.

FIG. 3 is a block diagram illustrating a fundamental arrangement of the print server 20. A CPU 201 controls various operations performed by the print server 20 according to a program stored in a read only memory (ROM) 202, a main memory 203, or a hard disk 220 or a program supplied from a floppy disk (FD) drive 221 or a compact-disc/digital versatile disc (CD/DVD) drive 222. The ROM 202 stores control programs executable by the CPU 201. The main memory 203 can temporarily store programs and image data and functions as a memory enabling the print server 20 to perform a high-speed operation.

A hard disk control unit 204 controls the hard disk 220, which stores an operating system, application programs, and image data. The hard disk 220 can store application software and driver software that enable the print server 20 to transmit/receive various control commands and data to/from the image forming apparatus 10 or other external apparatuses via an interface control unit 209. The application software and the driver software can be installed on the hard disk 220 from a computer readable recording medium via the FD drive 221 or the CD/DVD drive 222. Furthermore, the application software and the driver software are downloadable via the network NW and the interface control unit 209 and installable on the hard disk 220.

An FD drive control unit 205 controls the FD drive 221. A compact-disc/digital versatile disc (CD/DVD) drive control unit 206 controls the CD/DVD drive 222. A keyboard/mouse control unit 207 controls a keyboard/mouse 230, which enables an operator to input instructions. A display control unit 208 controls a display unit 240, which displays various text and image data (information) on a screen.

The interface control unit 209 enables the print server 20 to communicate with the image forming apparatus 10 or an external apparatus connected via the network NW (e.g., LAN or USB) according to a communication control method. A modem 210 enables the print server 20 to communicate with an external apparatus via a communication line.

The file server 30 and the client PC 40 can have the same configuration as the print server 20, or alternatively a similar configuration.

First Exemplary Embodiment

Figure 4:
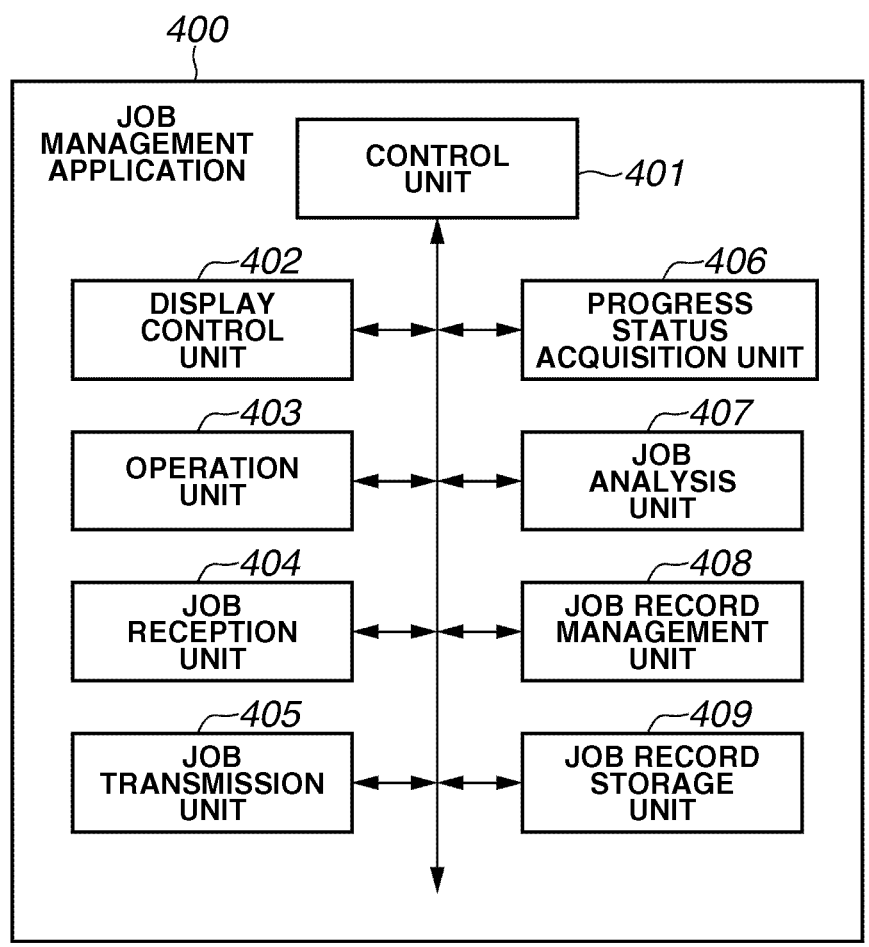
FIG. 4 illustrates an example of a configuration of a job management application according to a first exemplary embodiment of the present invention.

Referring now also to FIG. 4, there is shown a block diagram illustrating an example of a configuration of a job management application 400 according to a first exemplary embodiment of the present invention. In the exemplary embodiment, the job management application 400 is a software program installable and operable on the print server 20.

A control unit 401 controls various operations realized by the job management application 400 under the control of the CPU 201. A display control unit 402 causes the display unit 240 to display various settings and the state (progress status) of various jobs that the job management application 400 can manage. An operation unit 403 enables an operator to change various settings and to perform job-related operations (for example, display instruction, cancel instruction, and reprint instruction). An operator can perform these operations with the keyboard/mouse 230.

A job reception unit 404 receives a print job or other information from the client PC 40 via the interface control unit 209. A job transmission unit 405 transmits a print job or other information to the image forming apparatus 10 via the interface control unit 209.

A progress status acquisition unit 406 acquires error information and a job state (progress status of a print job) from the image forming apparatus 10 via the interface control unit 209.

A job analysis unit 407 analyzes a print job or information received by the job reception unit 404. If the job analysis unit 407 determines that the received print job is a variable print job generated based on two or more records, the job analysis unit 407 detects a boundary or boundaries (breakpoints) of records and associates each record with a corresponding print page based on a result of boundary detection.

A job record storage unit 409 stores a result of print job analysis obtained by the job analysis unit 407 as job record management information together with the print job. The job record management information includes link information according to which each record can be associated with a corresponding print page, if it is determined that the received print job is a print job for a variable print.

A job record management unit 408 manages the job record management information stored in the job record storage unit 409.

Figure 19:
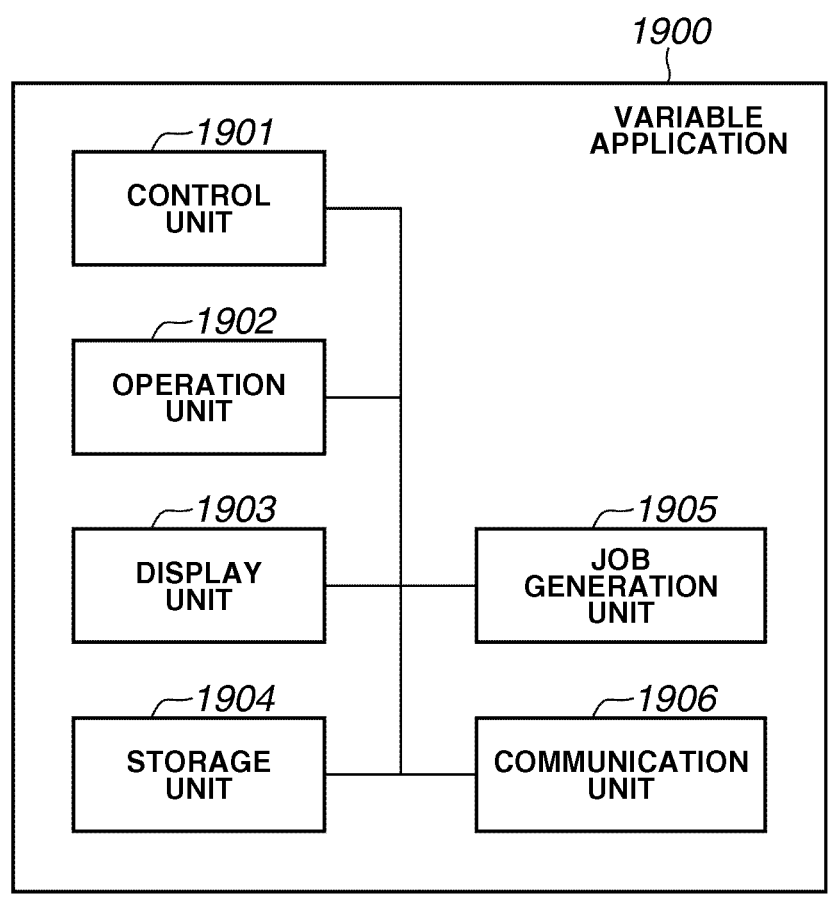
FIG. 19 is a block diagram illustrating an example of a variable application installed on a client personal computer (PC).

FIG. 19 illustrates an example of a configuration of a variable application 1900, which enables an operator of the client PC 40 to generate variable print data including PPML.

A control unit 1901 controls various operations realized by the variable application 1900 under the control of the CPU of the client PC 40. An operation unit 1902 enables an operator to perform various operations relating to settings and records (including designation of a record and reprint of a record) with the keyboard/mouse 230 of the client PC 40.

A display unit 1903 displays information relating to a variable print. For example, the display unit 1903 communicates with a database and displays content data included in each record. A storage unit 1904 stores setting content and other information relating to a variable print.

A job generation unit 1905 generates a print job based on setting content received via the operation unit 1902. A communication unit 1906 can communicate with the file server 30 and the image forming apparatus 10 to perform transmission/reception of data.

The variable application 1900 cannot identify a print page corresponding to each record. If a user designates a record to be reprinted via the operation unit 1902, the variable application 1900 transmits the designated record to the job management application 400. As a result, the job management application 400 generates a print instruction including a print range set to a page corresponding to a designated record. Thus, the user can easily realize a print for a designated record. In an exemplary embodiment, the above-described variable application 1900 and the job management application 400 can be installed on the client PC 40.

Figure 5A:
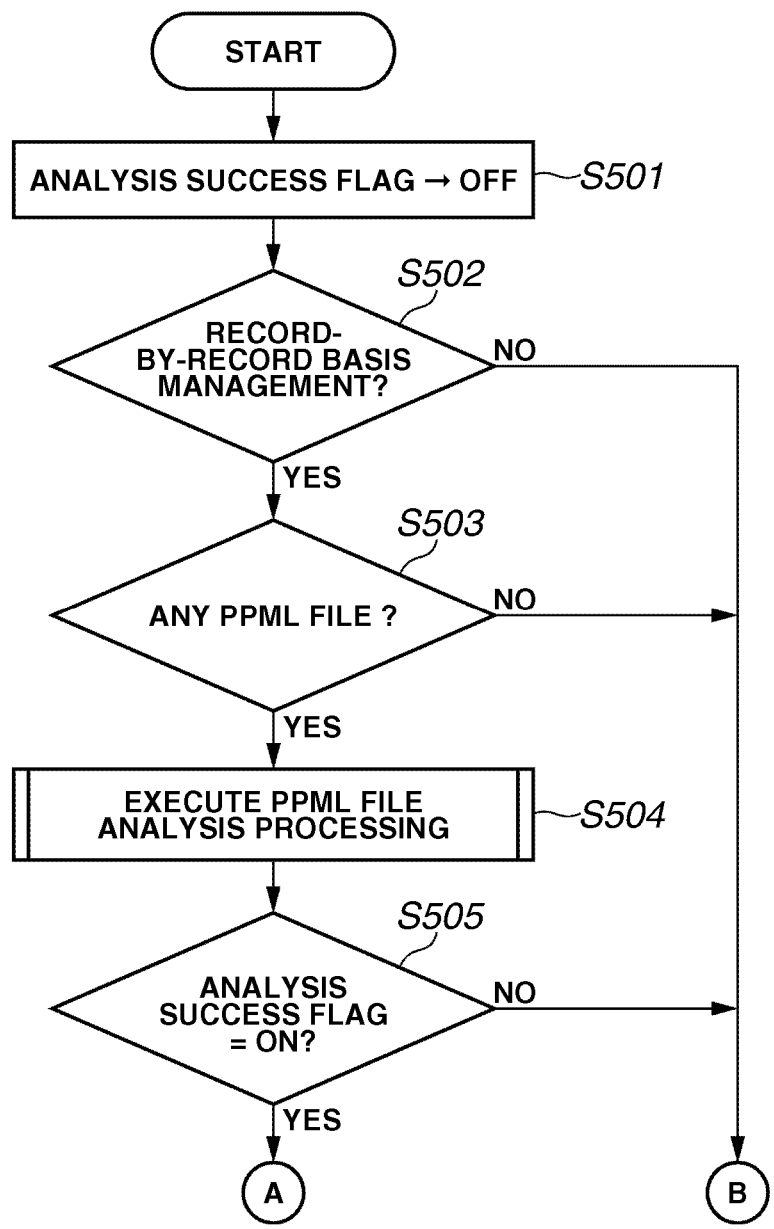
FIG. 5A is a flowchart illustrating an example of an operation performed by the job management application according to the first exemplary embodiment of the present invention.
Figure 5B:
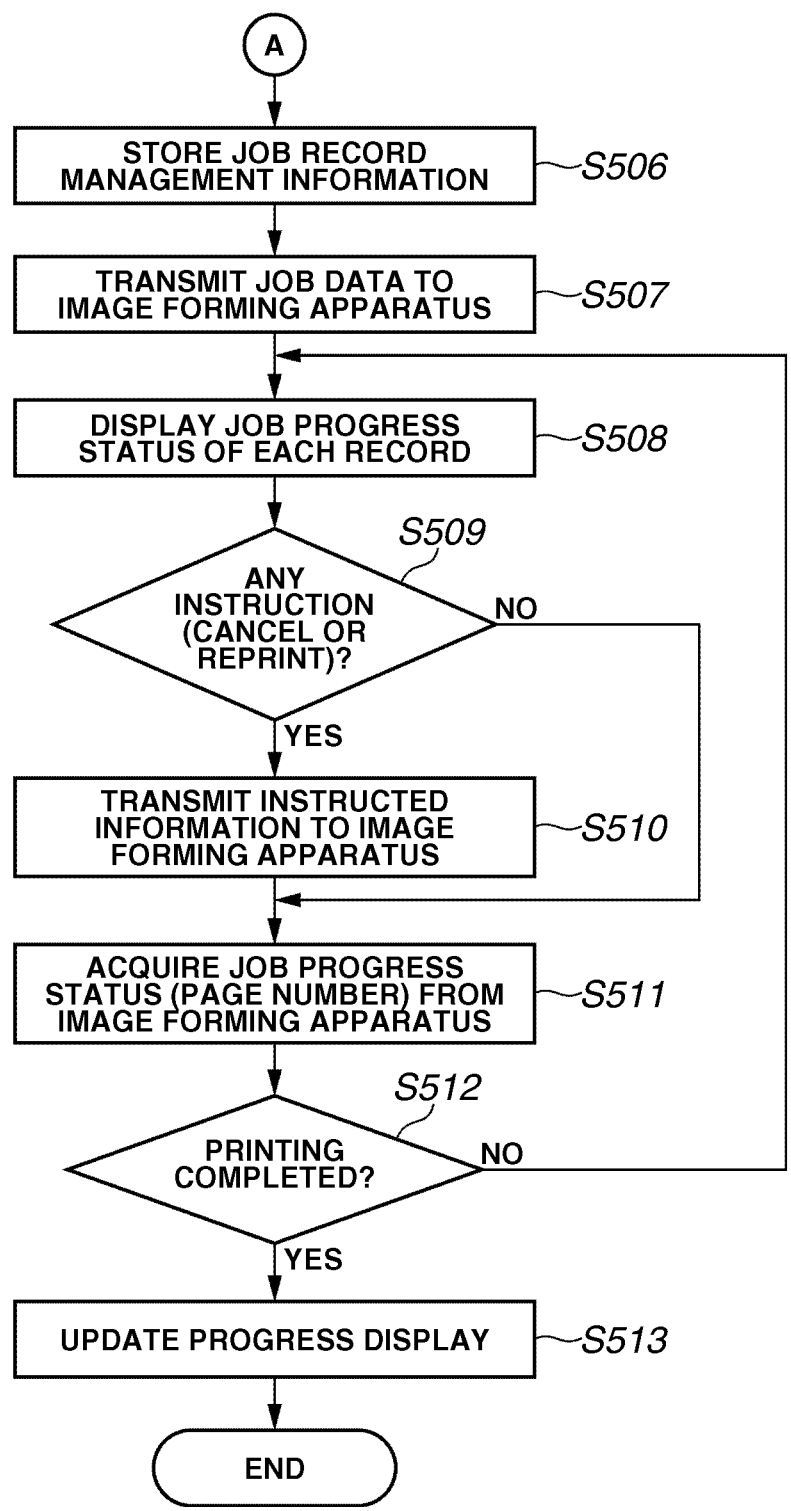
FIG. 5B is a flowchart illustrating the continuation of an example of an operation performed by the job management application according to the first exemplary embodiment of the present invention.

FIGS. 5A to 5C are flowcharts illustrating an example operation performed by the job management application 400 according to the first exemplary embodiment.

If the job reception unit 404 of the job management application 400 receives a print job from the client PC 40, the control unit 401 of the job management application 400 starts processing illustrated in FIG. 5A. In step S501, the control unit 401 sets an analysis success flag to OFF.

In step S502, the control unit 401 determines whether to perform a record-by-record basis management of a print job. The control unit 401 performs this determination based on the information set by an operator via a setting dialog illustrated in FIG. 10, which is described in detail below. If the control unit 401 determines that the record-by-record basis management is selected (YES in step S502), the processing proceeds to step S503. If the control unit 401 determines that the record-by-record basis management is not selected (NO in step S502), the processing proceeds to step S514 illustrated in FIG. 5C.

In step S503, the job analysis unit 407 determines whether the received print job includes a PPML file. For example, if a print job includes a PPML file, it includes a declaration "PPML" as illustrated in FIG. 7A. The job analysis unit 407 confirms the declaration "PPML" and determines the presence of a PPML file.

If in step S503 the job analysis unit 407 determines that the received print job includes a PPML file, the processing proceeds to step S504. If in step S503 the job analysis unit 407 determines that the received print job does not include a PPML file, the processing proceeds to step S514.

In step S504, the job analysis unit 407 executes PPML file analysis processing to analyze the content of the PPML file included in the received print job. In the PPML file analysis processing, if a boundary or boundaries (breakpoints) of the records in the print job can be detected, the analysis success flag is set to ON. If a boundary or boundaries (breakpoints) of the records cannot be detected, the analysis success flag is maintained in an OFF state. The PPML file analysis processing (step S504) is described below in more detail with reference to FIG. 6.

In step S505, the control unit 401 determines whether the analysis success flag is ON. If the control unit 401 determines that the analysis success flag is ON (YES in step S505), the processing proceeds to step S506 illustrated in FIG. 5B. If the control unit 401 determines that the analysis success flag is OFF (NO in step S505), the processing proceeds to step S514.

Referring again to FIG. 5B, in step S506, under the control of the control unit 401, the job record management unit 408 stores job record management information (which in the present embodiment is information based on a result of analysis obtained by the PPML file analysis processing in step S504) into the job record storage unit 409. In step S507, the control unit 401 causes the job transmission unit 405 to transmit the print job (with the analysis processing successfully completed) to the image forming apparatus 10.

In step S508, the display control unit 402 causes the display unit 240 to display the latest status (progress status) of the print job on a record-by-record basis. The display control unit 402 performs this display processing based on the job record management information stored in the job record storage unit 409 and, when there has been a prior iteration of step S511, the progress status acquired from the image forming apparatus 10 by the progress status acquisition unit 406. Step S511 is described below.

In step S509, the control unit 401 determines whether any instruction (for example, cancel or reprint) is received via the operation unit 403. If the control unit 401 determines that there is an instruction received via the operation unit 403 (YES in step S509), the processing proceeds to step S510. In step S510, the control unit 401 causes the job transmission unit 405 to transmit the instructed information (for example, cancel or reprint) to the image forming apparatus 10. If the control unit 401 determines that there is not any instruction received via the operation unit 403 (NO in step S509), the processing skips step S510 and proceeds to step S511.

In step S511, the control unit 401 causes the progress status acquisition unit 406 to acquire a progress status (e.g., a page number) of the print job processed in the image forming apparatus 10.

In step S512, the control unit 401 determines whether print processing of the print job has been completed based on the progress status of the print job acquired by the processing of step S511. If the control unit 401 determines that the print processing has been completed (YES in step S512), the processing proceeds to step S513. If the control unit 401 determines that the print processing has not yet been completed (NO in step S512), the processing returns to step S508. In step S513, the control unit 401 causes the display control unit 402 to control the display unit 240 to display the latest status of the print job, (which in this example is completion of the print processing), and terminates the processing of this routine.

Referring again to FIG. 5C, in step S514, under the control of the control unit 401, the job record management unit 408 stores job record management information in the job record storage unit 409. At this moment, an analysis of record information has not been completed. Therefore, the job record management unit 408 stores only the job information as job record management information in the job record storage unit 409. In step S515, the control unit 401 causes the job transmission unit 405 to transmit the print job to the image forming apparatus 10.

In step S516, the display control unit 402 causes the display unit 240 to display the latest status (progress status) of the print job on a job-by-job basis. The display control unit 402 performs this display processing based on the job record management information stored in the job record storage unit 409 and, when there has been a prior iteration of step S519, the progress status acquired from the image forming apparatus 10 by the progress status acquisition unit 406. Step S519 is described below.

In step S517, the control unit 401 determines whether any instruction (for example, cancel or reprint) is received via the operation unit 403. If the control unit 401 determines that there is an instruction received via the operation unit 403 (YES in step S517), the processing proceeds to step S518. In step S518, the control unit 401 causes the job transmission unit 405 to transmit instructed information (information relating to the received instruction (for example, a cancel or reprint)) to the image forming apparatus 10. If the control unit 401 determines that there is not any instruction received via the operation unit 403 (NO in step S517), the processing skips step S518 and proceeds to step S519.

In step S519, the control unit 401 causes the progress status acquisition unit 406 to acquire a progress status of the print job processed in the image forming apparatus 10.

In step S520, the control unit 401 determines whether print processing of the print job has been completed based on the progress status of the print job acquired by the processing in step S519. If the control unit 401 determines that the print processing has been completed (YES in step S520), the processing proceeds to step S521. If the control unit 401 determines that the print processing has not yet been completed (NO in step S520), the processing returns to step S516.

In step S521, the control unit 401 causes the display control unit 402 to control the display unit 240 to display the latest status of the print job, (which in this example is completion of the print processing), and terminates the processing of this routine.

Figure 6:
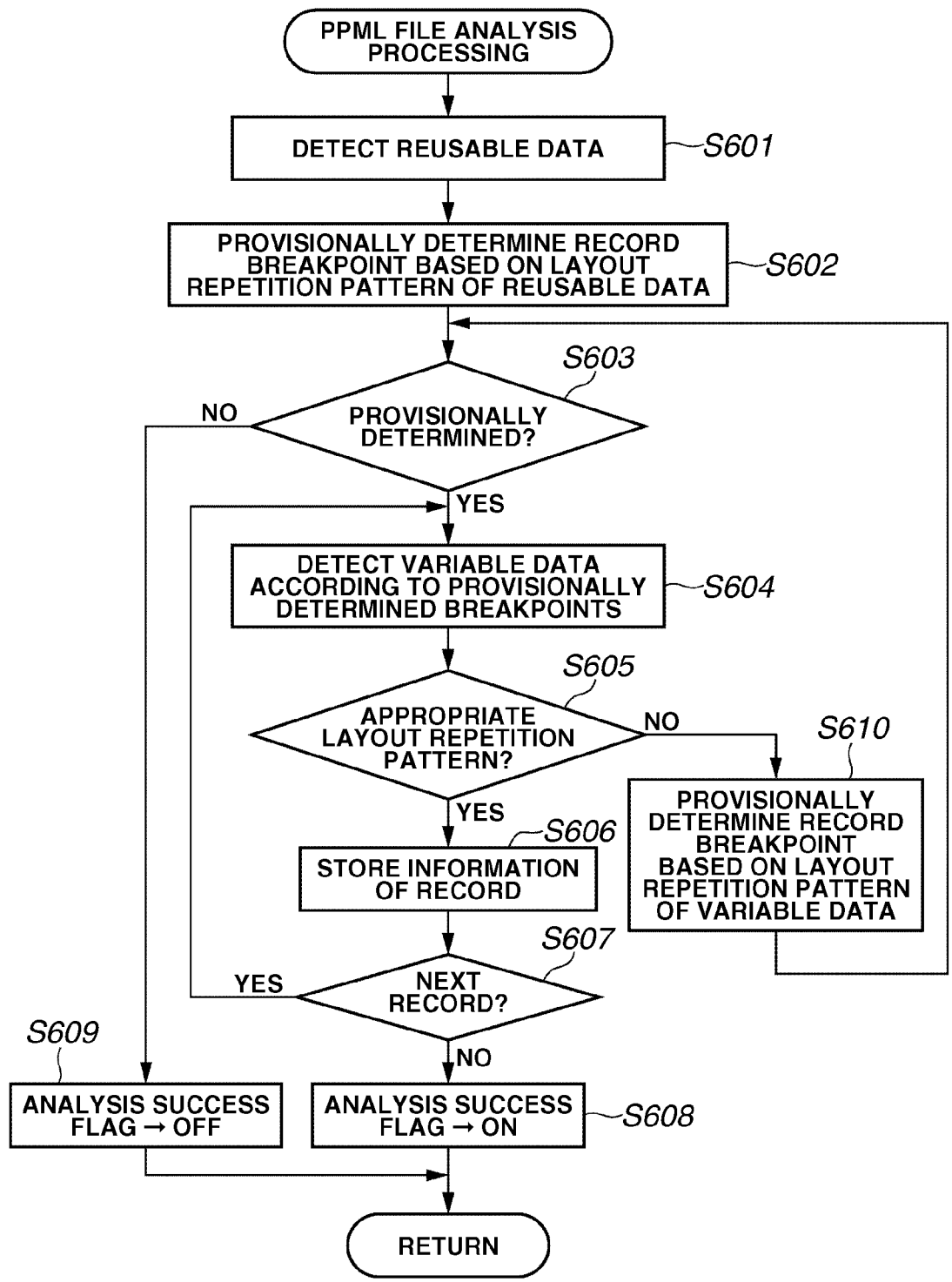
FIG. 6 is a flowchart illustrating an example of PPML file analysis processing.

FIG. 6 is a flowchart illustrating an example of details of the PPML file analysis processing (step S504 illustrated in FIG. 5A).

In step S601, the job analysis unit 407 analyzes the content of a PPML file and detects a reference instruction of reusable data. The reusable data is data that can be reused in a variable print, such as image data commonly used for a plurality of records. The reference instruction of reusable data designates reusable data to be used.

In step S602, the job analysis unit 407 provisionally determines breakpoints of records (e.g., number of pages of each record) based on a repetition of the reference instruction of the reusable data in the PPML file. Namely, the job analysis unit 407 determines boundary candidates of the records based on the cycles of reusable data that is frequently referred to.

In step S603, the job analysis unit 407 determines whether the breakpoints of the records have been provisionally determined by the processing in step S602. If the job analysis unit 407 determines that the breakpoints of the records have been provisionally determined (YES in step S603), the processing proceeds to step S604 (described below). If the job analysis unit 407 determines that the breakpoints of the records have not been provisionally determined (NO in step S603), the processing proceeds to step S609 wherein the job analysis unit 407 sets the analysis success flag to OFF and terminates the PPML file analysis processing.

In step S604, the job analysis unit 407 detects variable data according to the provisionally determined breakpoints. The variable data is data that can be changed in each record in a variable print. For example, the variable data is client data (e.g., address and name) in a variable print performed for a record of each client.

In step S605, the job analysis unit 407 determines whether a layout repetition pattern of the detected variable data is appropriate. More specifically, the job analysis unit 407 determines whether the type of variable data and the drawing position thereof are similar between page ranges segmented according to the provisionally determined breakpoints of the records. Namely, the job analysis unit 407 determines whether the type of variable data and the drawing position thereof are similar between ranges corresponding to pages dissected by the boundary candidates in a print job.

If the job analysis unit 407 determines that the layout repetition pattern of the detected variable data is appropriate, i.e., the type of variable data and the drawing position thereof are similar between page ranges segmented according to the boundary candidates (YES in step S605), the job analysis unit 407 identifies the boundary candidates as the boundaries of the records. Then, the processing proceeds to step S606. If the job analysis unit 407 determines that the layout repetition pattern of the detected variable data is inappropriate (NO in step S605), the processing proceeds to step S610.

In step S610, the job analysis unit 407 provisionally determines breakpoints of records (by redetermining boundary candidates of records) based on the layout repetition pattern of variable data. Then, the processing returns to step S603.

In step S606, the job analysis unit 407 stores record information (e.g., record number, number of pages, and variable data) of the record as job record management information illustrated in FIG. 9, which is described in detail below. The job record storage unit 409 includes a storage area temporarily storing data and a storage area storing a determination result. Namely, in step S606, the job analysis unit 407 stores the record information into the temporary storage area of the job record storage unit 409. In the above-described step S506, the job record management unit 408 stores record information resulting from the PPML file analysis processing of step S504 in the determination result storage area of the job record storage unit 409.

In step S607, the job analysis unit 407 determines whether there is the next record. If the job analysis unit 407 determines that there is the next record (YES in step S607), the processing returns to step S604. If the job analysis unit 407 determines that there is no next record (NO in step S607), the processing proceeds to step S608.

In step S608, the job analysis unit 407 sets the analysis success flag to ON and terminates the PPML file analysis processing.

FIG. 7A illustrates an example PPML file, according to which one record is composed of three pages as illustrated in FIG. 7B and according to which a print product using different backgrounds (reusable data) on each page of one record is output. The first and second pages of each record include variable data. The first page is composed of reusable data A and variable data An (n is a natural number indicating a record number). The second page is composed of reusable data B and variable data Bn. The third page is composed of reusable data C.

In this exemplary case, the job analysis unit 407 executes the PPML file analysis processing illustrated in FIG. 6 in the following manner.

(1) In step S602, the job analysis unit 407 provisionally determines that one record includes three pages based on the repetition of reference instruction of the reusable data A to C (e.g., the layout repetition pattern of the reusable data A to C).

(2) In step S604, with reference to the above-described provisionally determination processing (1), the job analysis unit 407 detects variable data A1, variable data B1, variable data A2, and variable data B2 included in three pages (i.e., in the provisionally determined ranges).

(3) In step S605, the job analysis unit 407 identifies the layout repetition pattern of variable data of three pages using a result of the processing (2) and determines whether the type of variable data and the drawing position thereof are similar between corresponding pages.

According to the example of FIGS. 7A and 7B, the variable data An on the first page, the variable data Bn on the second page, and no variable data on the third page are mutually similar in the type of data. The drawing position of variable data An accords with the drawing position of variable data Bn. Therefore, the job analysis unit 407 can determine that the layout repetition pattern is appropriate. As a result, the job analysis unit 407 determines that the provisionally determined pages (in this example, first to third pages) constitute one record (YES in step S605).

FIG. 8A illustrates another example PPML file, according to which one record is composed of two pages as illustrated in FIG. 8B and according to which a print product using the same background (reusable data) on each page of one record is output. The first and second pages of each record include variable data. The first page is composed of reusable data A and variable data Xn (n is a natural number indicating a record number). The second page is composed of reusable data A and variable data Yn.

In this case, the job analysis unit 407 executes the PPML file analysis processing illustrated in FIG. 6 in the following manner.

(1) In step S602, the job analysis unit 407 provisionally determines that one record includes one page based on the repetition of reference instruction of the reusable data A.

(2) In step S605, the job analysis unit 407 identifies the layout repetition pattern of variable data of respective pages. In this case, variable data X1 on the first record candidate (Page 1) and the variable data Y1 on the second record candidate (Page 2) are mutually different in the layout repetition pattern. Therefore, the job analysis unit 407 determines that the layout repetition pattern is inappropriate.

(3) In step S610, the job analysis unit 407 provisionally determines that one record includes two pages based on the layout repetition pattern of variable data Xn and Yn.

(4) Then, in step S605, the job analysis unit 407 identifies the layout repetition pattern of variable data in every two pages. The variable data Xn on the first page accords with the variable data Yn on the second page. The drawing position of the variable data Xn accords with the drawing position of the variable data Yn. Therefore, the job analysis unit 407 can determine that the layout repetition pattern is appropriate. As a result, the job analysis unit 407 determines that the provisionally determined pages (i.e., first and second pages) constitute one record.

Figure 9:
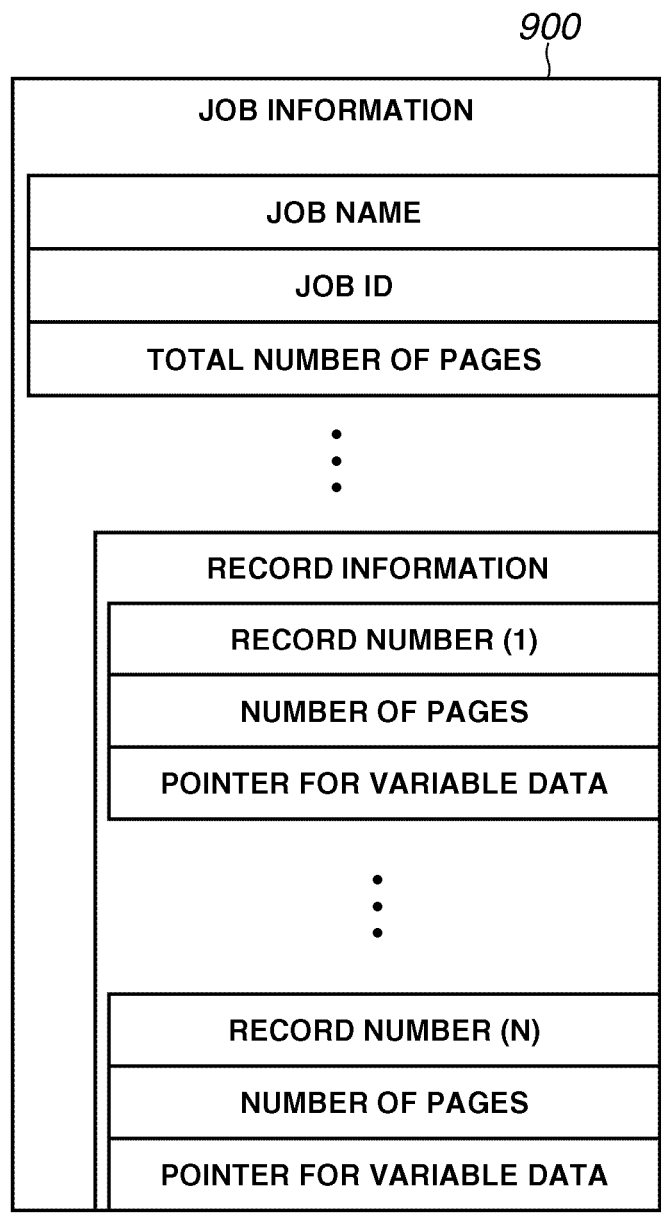
FIG. 9 illustrates job record management information according to an exemplary embodiment of the present invention.

FIG. 9 illustrates an example of job record management information 900 stored in the job record storage unit 409. The job record management information 900 includes job information, such as job name, job identification (ID), and total number of pages. Furthermore, the job record management information 900 includes variable data information (record number, number of pages, pointer for variable data, etc.) for a record of a print job if the job analysis unit 407 has succeeded in the analysis on this record in the PPML file analysis processing.

Figure 10:
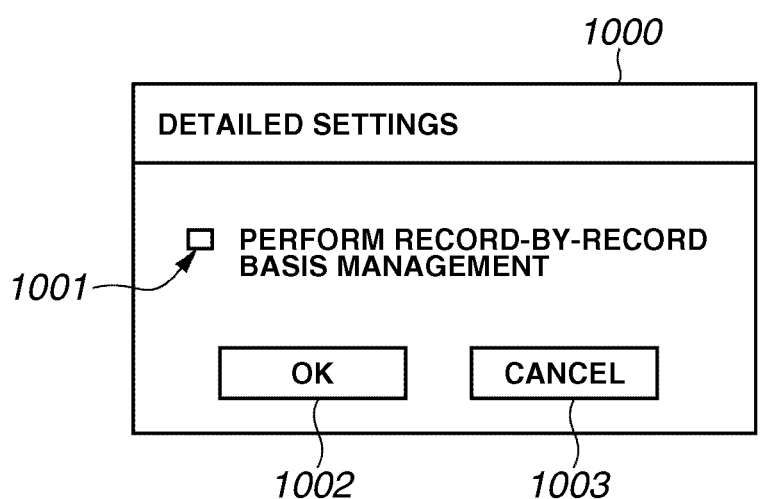
FIG. 10 illustrates an example of setting dialog that enables an operator to select a record-by-record basis management of a print job according to an exemplary embodiment of the present invention.

FIG. 10 illustrates a setting dialog 1000 of the job management application 400 according to an exemplary embodiment, which functions as a setting unit enabling an operator to select a record-by-record basis management of a print job.

The job management application 400 has a predetermined menu that enables an operator to activate the setting dialog 1000. The display control unit 402 causes the display unit 240 to display the setting dialog 1000. The setting dialog 1000 includes a check box 1001, an OK button 1002, and a cancel button 1003. The check box 1001 enables an operator to designate a record-by-record basis management. The OK button 1002 enables the setting designated via the check box 1001 and closes the setting dialog 1000. The cancel button 1003 disables the setting designated via the check box 1001 and closes the setting dialog 1000 without changing the settings.

If an operator clicks on the OK button 1002 after the check box 1001 is checked, the job management application 400 performs a record analysis on a print job and a record-by-record basis display control and management. If an operator clicks on the OK button 1002 before the check box 1001 is not checked, the job management application 400 does not perform a record analysis on a print job and a record-by-record basis display control and management. In this manner, the setting dialog 1000 enables an operator to determine whether the job analysis unit 407 performs the record analysis on a print job and performs a record-by-record basis display control and management.

In an exemplary embodiment, the box 1001 is in a non-checked state or in a checked state as initial or default settings when the job management application 400 is installed on the system.

FIG. 11 illustrates an example of record display performed by the job management application 400 according to the first exemplary embodiment.

The job management application 400 displays, for each print job, print job-related information 1105 including job name, state (progress status of print processing), name of output printer, and number of pages. Furthermore, the job management application 400 displays record-related information 1106 for a print job of a variable print performed for two or more records in which the job analysis unit 407 has succeeded in the record analysis. The job management application 400 displays, for each record, record-related information 1106 including record number 1101, state (progress status of print processing) 1102, variable data information 1103, and number of pages 1104.

The state (progress status of print processing) 1102 displays a progress status of a print job processed in the image forming apparatus 10 that is acquired by the progress status acquisition unit 406. For example, the job management application 400 acquires a page number of a print job currently processed in the image forming apparatus 10 and calculates a record number based on the job record management information stored in the job record storage unit 409. Then, the job management application 400 performs a record-by-record basis display (such as "printing in progress" or "printing completed").

FIG. 12 illustrates another example of record display performed by the job management application 400 according to the first exemplary embodiment.

Similar to the record display example illustrated in FIG. 11, the job management application 400 displays various information (job name, state (progress status of print processing), name of output printer, and number of pages) of each print job. Furthermore, the job management application 400 displays record number 1201, state (print processing progress status) 1202, variable data information 1203, and number of pages 1204 for a print job of a variable print performed for two or more records in which the job analysis unit 407 has succeeded in the record analysis.

The job management application 400 can also perform a record-by-record basis display for a print job that is cancelled or suspended due to error. The information relating to suspension due to error can be displayed based on a progress status of a print job processed in the image forming apparatus 10 that is acquired by the progress status acquisition unit 406.

For example, as illustrated in FIG. 12, it is useful to display a group of records including a failed or cancelled record (an object record) so that an operator can easily recognize the failed or cancelled record even if there are a great number of records. It is also useful that the job management application 400 allows an operator to select a group display or a single display of an object record. The group display can include a print-completed record or a print-waiting record as an object record.

Furthermore, in a state where one or more print jobs are displayed in a highlighted (selected) state as illustrated in FIG. 11 or 12, it is useful that the job management application 400 allows an operator to input a cancel instruction or a reprint instruction on a job-by-job basis with a right click of the mouse or selection from a menu screen. Furthermore, it is useful that the job management application 400 allows an operator to switch between a record-by-record basis display and another display.

Furthermore, in a state where one or more records are displayed in a highlighted (selected) state, it is useful that the job management application 400 allows an operator to input a cancel instruction or a reprint instruction on a record-by-record basis with a right click of the mouse or selection from a menu screen. In this case, the job management application 400 can cancel or reprint the designated record and other records following this record.

If an operator inputs a cancel instruction (designates a record to be cancelled), the control unit 401 of the job management application 400 calculates a page number or page range corresponding to an object record to be cancelled based on the job record management information stored in the job record storage unit 409. Then, the job transmission unit 405 transmits the calculated page number or page range of the object record to the image forming apparatus 10. The image forming apparatus 10 cancels the instructed page number or page range of the object record.

If an operator inputs a reprint instruction (designates a record to be reprinted), the control unit 401 of the job management application 400 calculates a page number or page range corresponding to an object record to be reprinted based on the job record management information stored in the job record storage unit 409. Then, the job transmission unit 405 transmits the calculated page number or page range of the object record to the image forming apparatus 10. The image forming apparatus 10 reprints the instructed page number or page range of the object record.

For example, if an operator designates record 20 as an object to be reprinted on the screen illustrated in FIG. 12, the control unit 401 transmits a print job designating a print range of "pages 39 and 40" corresponding to the record 20. If there is not any print job remaining in the image forming apparatus 10, the job transmission unit 405 transmits a print job to be reprinted together with the page number(s) or page range to the image forming apparatus 10 to perform a reprint operation.

As described above, according to the first exemplary embodiment, if a received print job is a print job of a variable print performed for two or more records, the job analysis unit 407 analyzes the print job to detect a boundary or boundaries (breakpoints) of records according to designated settings. If the job analysis unit 407 can detect the boundary or boundaries of the records, the job analysis unit 407 associates each record with a corresponding print page based on a result of detection. The information associating each record with a corresponding print page (job record management information) and the print job are stored in the job record storage unit 409 and can be managed by the job record management unit 408. Thus, if the received print job is a print job of a variable print, the first exemplary embodiment can manage each record in association with a print page. Thus, the first exemplary embodiment can manage a print job on a record-by-record basis, thereby improving usability.

If a job is generated for each record, another job may interrupt between two records. As described above, the first exemplary embodiment generates one job based on two or more records. Thus, the first exemplary embodiment can improve usability while maintaining the effects brought by one job. Furthermore, the setting dialog 1000 enables an operator to determine whether to perform a record-by-record basis management. For example, if the received print job is a print job of a variable print, an operator can select appropriate processing by determining whether the job analysis unit 407 performs the record analysis.

Second Exemplary Embodiment

A second exemplary embodiment of the present invention is described below. According to the above-described first exemplary embodiment, the job management application 400 runs on the print server 20. The second exemplary embodiment is different from the first exemplary embodiment in that a job management application 1300 runs on the image forming apparatus 10.

Figure 13:
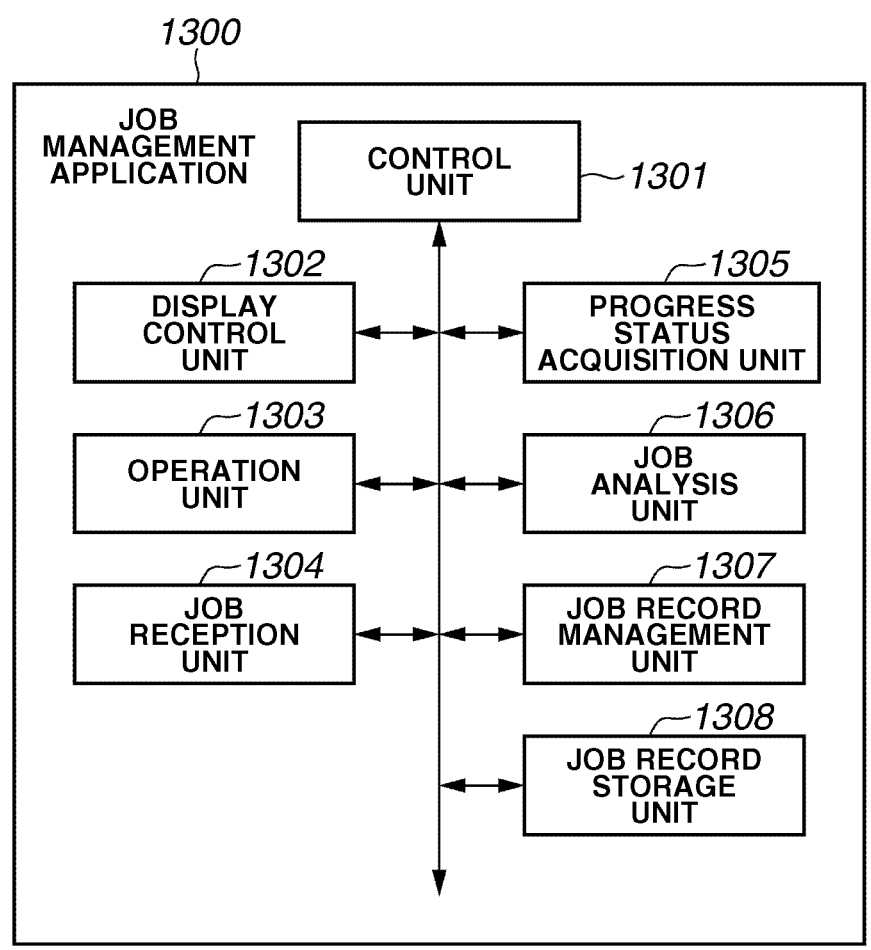
FIG. 13 illustrates an example of a configuration of a job management application according to a second exemplary embodiment of the present invention.

FIG. 13 is a block diagram illustrating an example configuration of the job management application 1300. The ROM 102 of the image forming apparatus 10 stores the job management application 1300 as a program running on the image forming apparatus 10.

A control unit 1301 controls various operations realized by the job management application 1300 under the control of the system control unit 101. A display control unit 1302 causes the display unit 107 to display various settings and the state (progress status) of various jobs that the job management application 1300 can manage. An operation unit 1303 enables an operator to change various settings and perform job-related operations (for example, display instruction, cancel instruction and/or reprint instruction). An operator can perform these operations via the operation unit 106.

A job reception unit 1304 receives a print job or other information from the print server 20 (the client PC 40) via the interface control unit 110. A progress status acquisition unit 1305 monitors and acquires error information and a job state (progress status of a print job) from the record control unit 109.

A job analysis unit 1306 analyzes the information (e.g., print job) received by the job reception unit 1304. If the job analysis unit 1306 determines that the received print job is a print job of a variable print performed for two or more records, the job analysis unit 1306 detects a boundary or boundaries (breakpoints) of the records and associates each record with a corresponding print page based on a result of detection.

A job record storage unit 1308 stores a result of print job analysis obtained by the job analysis unit 1306 as job record management information together with the print job. The job record management information includes link information according to which each record can be associated with a corresponding print page, if it is determined that the received print job is a print job of a variable print.

A job record management unit 1307 manages the job record management information stored in the job record storage unit 1308.

Figure 14A:
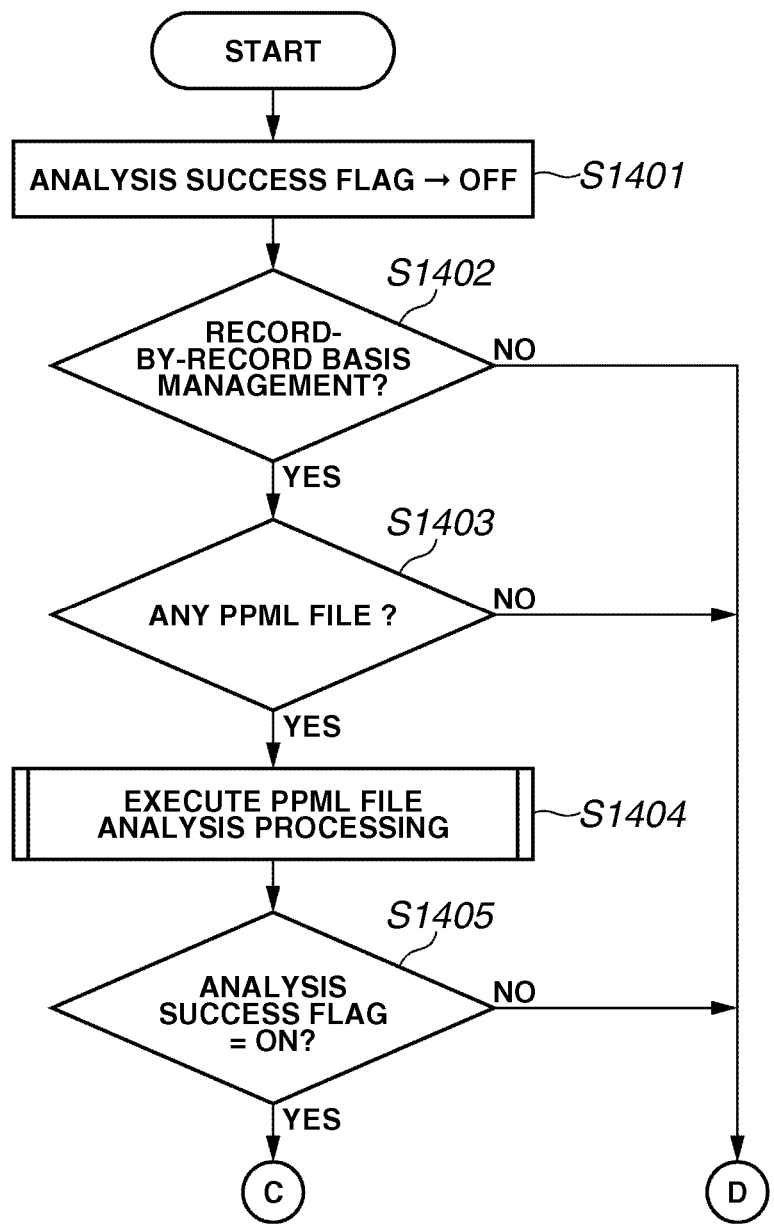
FIG. 14A is a flowchart illustrating an example of an operation performed by the job management application according to the second exemplary embodiment of the present invention.

FIGS. 14A to 14C are flowcharts illustrating an example operation realized by the job management application 1300 according to the second exemplary embodiment.

If the job reception unit 1304 of the job management application 1300 receives a print job from the print server 20 (client PC 40), the control unit 1301 of the job management application 1300 starts processing illustrated in FIG. 14A.

In step S1401, the control unit 1301 sets the analysis success flag to OFF.

In step S1402, the control unit 1301 determines whether to perform a record-by-record basis management of a print job. To perform this determination, the control unit 1301 causes the display unit 107 to display the content corresponding to the setting dialog 1000 illustrated in FIG. 10 to enable an operator to perform settings beforehand. The control unit 1301 performs the determination of step S1402 based on the settings designated by an operator.

If the control unit 1301 determines that the record-by-record basis management is selected (YES in step S1402), the processing proceeds to step S1403. If the control unit 1301 determines that the record-by-record basis management is not selected (NO in step S1402), the processing proceeds to step S1413 illustrated in FIG. 14C.

In step S1403, the job analysis unit 1306 determines whether the received print job includes a PPML file. If the job analysis unit 1306 determines that the received print job includes a PPML file (YES in step S1403), the processing proceeds to step S1404. If the job analysis unit 1306 determines that the received print job does not include a PPML file (NO in step S1403), the processing proceeds to step S1413.

In step S1404, the job analysis unit 1306 executes PPML file analysis processing to analyze the content of the PPML file included in the received print job. If a boundary or boundaries (breakpoints) of records of the print job can be detected in the PPML file analysis processing, the job analysis unit 1306 sets the analysis success flag to ON. If a boundary or boundaries (breakpoints) of records of the print job cannot be detected in the PPML file analysis processing, the job analysis unit 1306 sets the analysis success flag to OFF. The job analysis unit 1306 can execute the PPML file analysis processing according to the flowchart illustrated in FIG. 6 as described in the first exemplary embodiment.

In step S1405, the control unit 1301 determines whether the analysis success flag is set to ON. If the control unit 1301 determines that the analysis success flag is ON (YES in step S1405), the processing proceeds to step S1406 illustrated in FIG. 14B. If the control unit 1301 determines that the analysis success flag is OFF (NO in step S1405), the processing proceeds to step S1413 illustrated in FIG. 14C.

Referring again to FIG. 14B, in step S1406, under the control of the control unit 1301, the job record management unit 1307 stores job record management information resulting from the analysis processing of step S1404 in the job record storage unit 1308.

In step S1407, the display control unit 1302 causes the display unit 107 to display the latest status (progress status) of the print job on a record-by-record basis. The display control unit 1302 performs this display processing based on the job record management information stored in the job record storage unit 1308 and, when there has been a prior iteration of step S1410, the progress status acquired by the progress status acquisition unit 1305. Step S1410 is described below.

In step S1408, the control unit 1301 determines whether any instruction (for example, cancel or reprint) is received via the operation unit 1303. If the control unit 1301 determines that there is an instruction received via the operation unit 1303 (YES in step S1408), the processing proceeds to step S1409.

In step S1409, the control unit 1301 transmits instructed information (information relating to the received instruction (for example, cancel or reprint)) to the record control unit 109. If the control unit 1301 determines that there is not any instruction received via the operation unit 1303 (NO in step S1408), the processing skips step S1409 and proceeds to step S1410.

In step S1410, the control unit 1301 causes the progress status acquisition unit 1305 to acquire a progress status (e.g., a page number) of the print job processed in the record control unit 109.

In step S1411, the control unit 1301 determines whether print processing of the print job has been completed based on the progress status of the print job acquired by the processing of step S1410. If the control unit 1301 determines that the print processing has been completed (YES in step S1411), the processing proceeds to step S1412. If the control unit 1301 determines that the print processing has not been completed (NO in step S1411), the processing returns to step S1407.

In step S1412, the control unit 1301 causes the display control unit 1302 to control the display unit 107 to display the latest status of the print job, (here, completion of the print processing), and terminates the processing of this routine.

Referring again to FIG. 14C, in step S1413, the job record management unit 1307 stores job record management information in the job record storage unit 1308 under the control of the control unit 1301. At this moment, an analysis of record information has not been completed. Therefore, the job record management unit 1307 stores only the job information as job record management information in the job record storage unit 1308.

In step S1414, the display control unit 1302 causes the display unit 107 to display the latest status (progress status) of the print job on a record-by-record basis. The display control unit 1302 performs this display processing based on the job record management information stored in the job record storage unit 1308 and, when there has been a prior iteration of step S1417, the progress status acquired by the progress status acquisition unit 1305. Step S1417 is described below.

In step S1415, the control unit 1301 determines whether any instruction (for example, cancel or reprint) is received via the operation unit 1303. If the control unit 1301 determines that there is an instruction received via the operation unit 1303 (YES in step S1415), the processing proceeds to step S1416. In step S1416, the control unit 1301 transmits instructed information (information relating to the received instruction (for example, cancel or reprint)) to the record control unit 109. If the control unit 1301 determines that there is not any instruction received from the operation unit 1303 (NO in step S1415), the processing skips step S1416 and proceeds to step S1417.

In step S1417, the control unit 1301 causes the progress status acquisition unit 1305 to acquire a progress status of the print job processed in the record control unit 109.

In step S1418, the control unit 1301 determines whether print processing of the print job has been completed based on the progress status of the print job acquired by the processing of step S1417. If the control unit 1301 determines that print processing has been completed (YES in step S1418), the processing proceeds to step S1419. If the control unit 1301 determines that print processing has not completed (NO in step S1418), the processing returns to step S1414.

In step S1419, the control unit 1301 causes the display control unit 1302 to control the display unit 107 to display the latest status of the print job, (here completion of the print processing), and terminates the processing of this routine.

The job management application 1300 according to the second exemplary embodiment realizes a record display and operations similar to those of the first exemplary embodiment described with reference to FIGS. 11 and 12.

As described above, the second exemplary embodiment can obtain effects similar to those of the first exemplary embodiment. The second exemplary embodiment installs the job management application on the image forming apparatus 10 (not on the print server 20) and can improve usability.

Third Exemplary Embodiment

A third exemplary embodiment of the present invention is described below. According to the above-described first and second exemplary embodiments, the job management application 400 or 1300 runs on the print server 20 or on the image forming apparatus 10, and either the print server 20 or the image forming apparatus 10 realizes the required functions. In the third exemplary embodiment, to realize the functions of the job management application, the image forming apparatus 10 performs job analysis processing while the print server 20 performs a record-by-record basis display processing.

Figure 15:
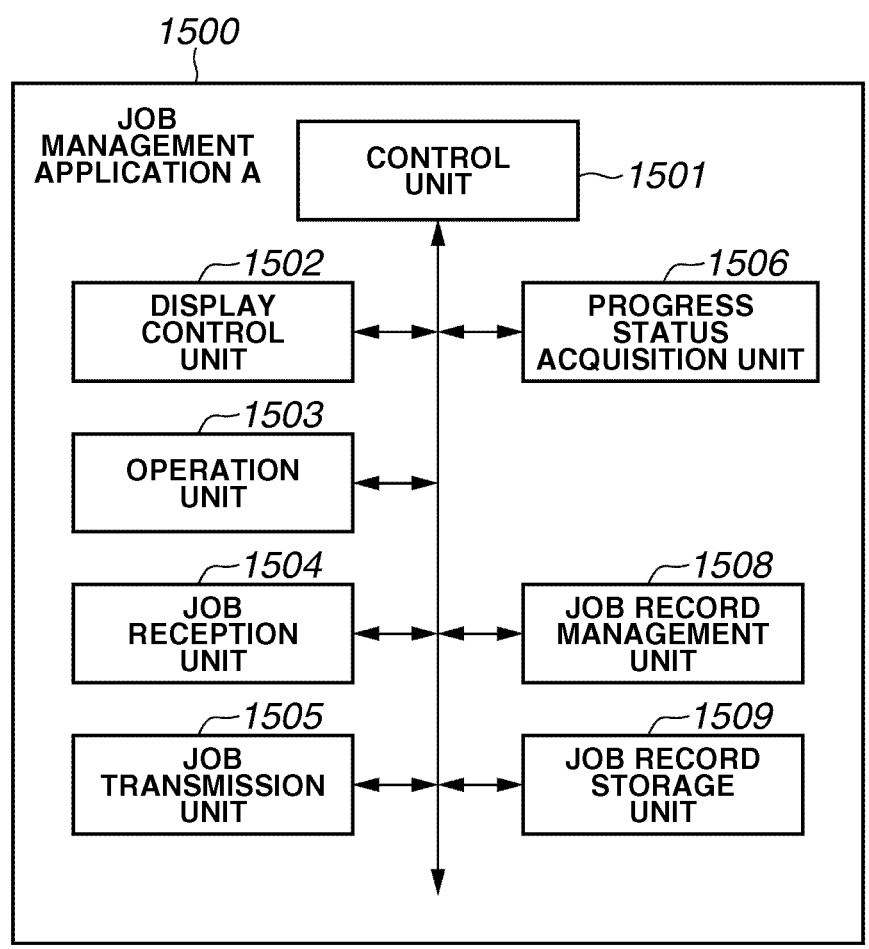
FIG. 15 illustrates an example of a configuration of a first job management application according to a third exemplary embodiment of the present invention.

FIG. 15 is a block diagram illustrating an example configuration of a first job management application A 1500 according to the third exemplary embodiment. The job management application A 1500 is a software program installable and operable on the print server 20.

A control unit 1501 controls various operations realized by the job management application A 1500 under the control of the CPU 201. A display control unit 1502 causes the display unit 240 to display various settings and the state (progress status) of various jobs that the job management application A 1500 can manage. An operation unit 1503 enables an operator to change various settings and to perform job-related operations (for example, display instruction, cancel instruction, and/or reprint instruction). An operator can perform these operations with the keyboard/mouse 230.

A job reception unit 1504 receives a print job or other information from the client PC 40 via the interface control unit 209. A job transmission unit 1505 transmits a print job or other information to the image forming apparatus 10 via the interface control unit 209.

A progress status acquisition unit 1506 acquires error information and a job state (progress status of a print job) from the image forming apparatus 10 via the interface control unit 209. Furthermore, the progress status acquisition unit 1506 acquires a result of analysis on a print job processed by the image forming apparatus 10 from the image forming apparatus 10 via the interface control unit 209. The acquired result of analysis includes link information associating each record with a corresponding print page, if the print job is for a variable print performed for two or more records.

A job record storage unit 1509 stores a result of print job analysis acquired by the progress status acquisition unit 1506 as job record management information together with the print job. The job record management information includes link information associating each record with a corresponding print page if the print job is for a variable print performed for two or more records.

A job record management unit 1508 manages job record management information stored in the job record storage unit 1509.

Figure 16:
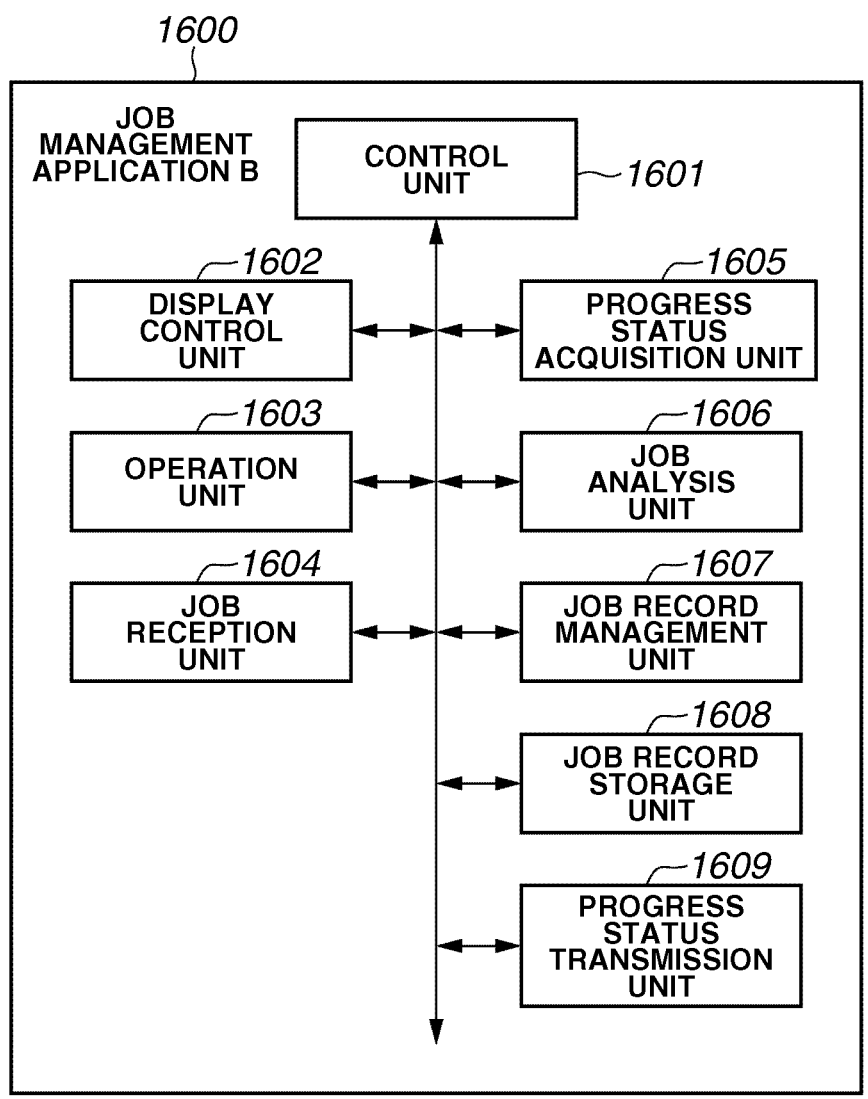
FIG. 16 illustrates an example of a configuration of a second job management application according to the third exemplary embodiment of the present invention.

FIG. 16 is a block diagram illustrating an example of a configuration of a second job management application B 1600 according to the third exemplary embodiment. The job management application B 1600 is a software program installable and operable on the image forming apparatus 10 to perform job analysis processing.

A control unit 1601 controls various operations realized by the job management application B 1600 under the control of the system control unit 101. A display control unit 1602 causes the display unit 107 to display various settings and the state (progress status) of various jobs that the job management application B 1600 can manage. An operation unit 1603 enables an operator to change various settings and perform job-related operations (for example, display instruction, cancel instruction, and/or reprint instruction). An operator can perform these operations via the operation unit 106.

A job reception unit 1604 receives a print job or other information from the print server 20 (the client PC 40) via the interface control unit 110. A progress status acquisition unit 1605 monitors and acquires error information and a job state (progress status of a print job) from the record control unit 109.

A job analysis unit 1606 analyzes the information (e.g., print job) received by the job reception unit 1604. If the job analysis unit 1606 determines that the received print job is a print job of a variable print performed for two or more records, the job analysis unit 1606 detects a boundary or boundaries (breakpoints) of the records and associates each record with a corresponding print page based on a result of detection.

A job record storage unit 1608 stores a result of print job analysis obtained by the job analysis unit 1606 as job record management information together with the print job. The job record management information includes link information according to which each record can be associated with a corresponding print page, if it is determined that the received print job is a print job of a variable print.

A job record management unit 1607 manages the job record management information stored in the job record storage unit 1608.

A progress status transmission unit 1609 transmits via the interface control unit 110 error information and a job state (print progress information) acquired by the progress status acquisition unit 1605. Furthermore, the progress status transmission unit 1609 transmits via the interface control unit 110 the job record management information (including link information according to which each record can be associated with a corresponding print page) stored in the job record storage unit 1608.

Figure 17:
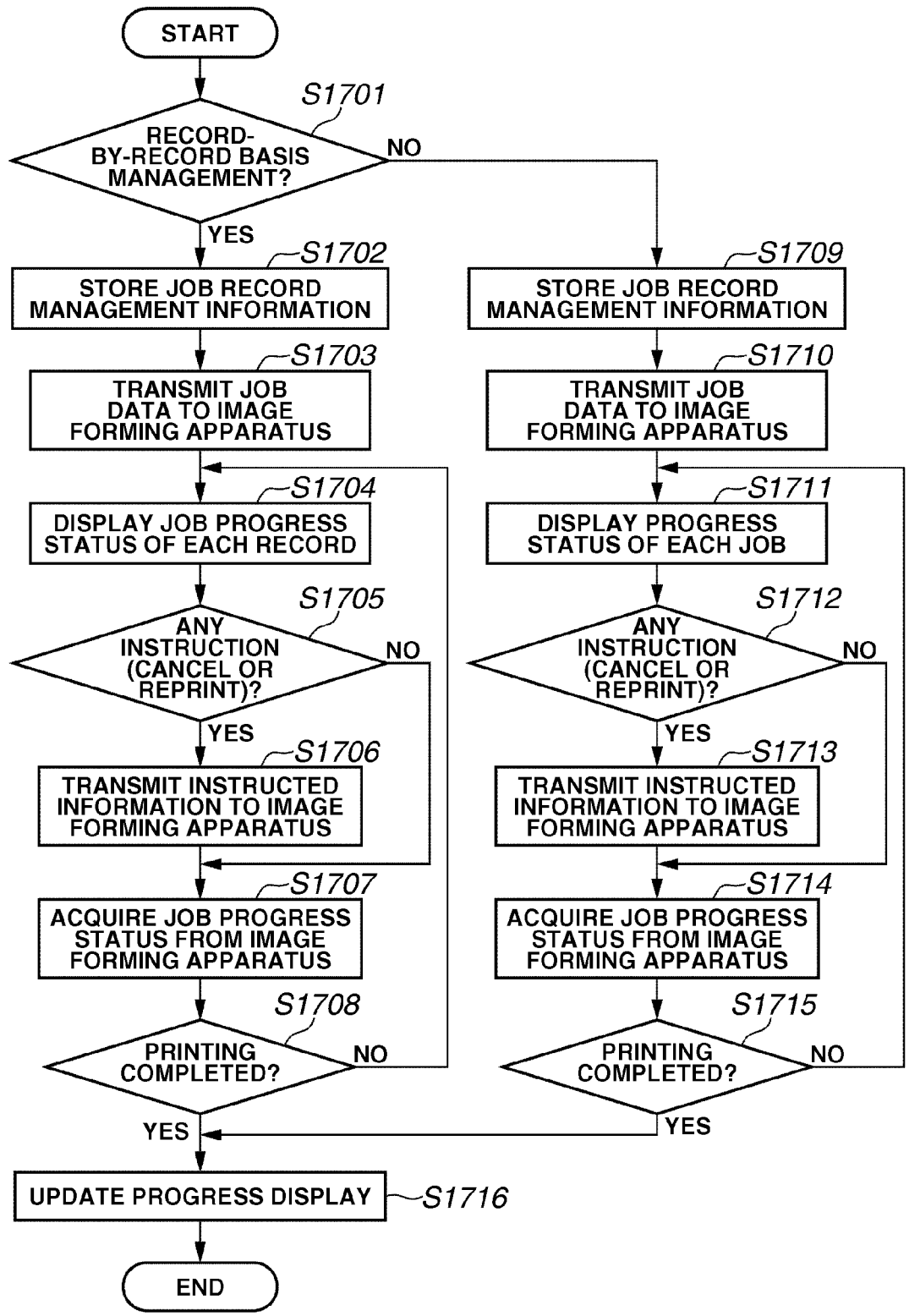
FIG. 17 is a flowchart illustrating an example of an operation performed by the first job management application according to the third exemplary embodiment of the present invention.

FIG. 17 is a flowchart illustrating an example operation of the first job management application A 1500 according to the third exemplary embodiment.

If the job reception unit 1504 of the job management application A 1500 receives a print job from the client PC 40, the first job management application A 1500 starts processing illustrated in FIG. 17.

In step S1701, the control unit 1501 determines whether to perform a record-by-record basis management of a print job. The control unit 1501 performs this determination based on the information set by an operator with the setting dialog 1000 illustrated in FIG. 10. If the control unit 1501 determines that the record-by-record basis management of a print job is selected (YES in step S1701), the processing proceeds to step S1702. If the control unit 1501 determines that the record-by-record basis management of a print job is not selected (NO in step S1701), the processing proceeds to step S1709.

In step S1702, under the control of the control unit 1501, the job record management unit 1508 stores job record management information in the job record storage unit 1509. At this moment, acquisition of record information has not been completed. Therefore, the job record management unit 1508 stores only the job information as job record management information in the job record storage unit 1509.

In step S1703, the control unit 1501 causes the job transmission unit 1505 to transmit the print job to the image forming apparatus 10.

In step S1704, the display control unit 1502 causes the display unit 240 to display the latest status (progress status) of the print job on a record-by-record basis. The display control unit 1502 performs this display operation based on the job record management information stored in the job record storage unit 1509 and, when there has been a prior iteration of step S1707, the information acquired from the image forming apparatus 10 by the progress status acquisition unit 1506 in step S1707. Step S1707 is described below.

In step S1705, the control unit 1501 determines whether any instruction (for example, cancel or reprint) is received via the operation unit 1503. If the control unit 1501 determines that there is an instruction received via the operation unit 1503 (YES in step S1705), the processing proceeds to step S1706. In step S1706, the control unit 1501 causes the job transmission unit 1505 to transmit instructed information (information relating to the received instruction (for example, cancel or reprint)) to the image forming apparatus 10. If the control unit 1501 determines that there is not any instruction received via the operation unit 1503 (NO in step S1705), the processing skips step S1706 and proceeds to step S1707.

In step S1707, the control unit 1501 causes the progress status acquisition unit 1506 to acquire a progress status of the print job processed in the image forming apparatus 10 (e.g., a page number) and a result of print job analysis (including link information according to which each record can be associated with a corresponding print page).

In step S1708, the control unit 1501 determines whether print processing of the print job has been completed based on the progress status of the print job acquired by the processing of step S1707. If the control unit 1501 determines that the print processing has been completed (YES in step S1708), the processing proceeds to step S1716. If the control unit 1501 determines that the print processing has not been completed (NO in step S1708), the processing returns to step S1704.

In step S1709, under the control of the control unit 1501, the job record management unit 1508 stores the job record management information in the job record storage unit 1509. At this moment, acquisition of record information has not been completed. Therefore, the job record management unit 1508 stores only the job information as job record management information in the job record storage unit 1509.

In step S1710, the control unit 1501 causes the job transmission unit 1505 to transmit the received print job to the image forming apparatus 10.

In step S1711, the display control unit 1502 causes the display unit 240 to display the latest status (progress status) of the print job on a job-by-job basis. The display control unit 1502 can perform this display processing based on the job record management information stored in the job record storage unit 1509 and, when there has been a prior iteration of step S1714, the information acquired from the image forming apparatus 10 by the progress status acquisition unit 1506 in step S1714.

In step S1712, the control unit 1501 determines whether any instruction (for example, cancel or reprint) is received via the operation unit 1503. If the control unit 1501 determines that there is an instruction received via the operation unit 1503 (YES in step S1712), the processing proceeds to step S1713.

In step S1713, the control unit 1501 causes the job transmission unit 1505 to transmit instructed information (information relating to the received instruction (for example, cancel or reprint)) to the image forming apparatus 10. If the control unit 1501 determines that there is not any instruction received via the operation unit 1503 (NO in step S1712), the processing skips step S1713 and proceeds to step S1714.

In step S1714, the control unit 1501 causes the progress status acquisition unit 1506 to acquire a progress status of the print job processed in the image forming apparatus 10.

In step S1715, the control unit 1501 determines whether print processing of the print job has been completed based on the progress status of the print job acquired by the processing of step S1714. If the control unit 1501 determines that the print processing has been completed (YES in step S1715), the processing proceeds to step S1716. If the control unit 1501 determines that the print processing has not been completed (NO in step S1715), the processing returns to step S1711.

In step S1716, the control unit 1501 causes the display control unit 1502 to control the display unit 240 to display the latest status of the print job, (here the completion of the print processing), and terminates the processing of this routine.

A processing operation performed by the second job management application B 1600 is similar to the operation performed by the second exemplary embodiment illustrated in FIGS. 14A to 14C and different in the following processing.

In steps S1407, S1412, S1414, and S1419 of the second exemplary embodiment, the display control unit 1302 causes the display unit 107 to display the latest status of a print job. The third exemplary embodiment is similar to the second exemplary embodiment in that the display control unit 1602 causes the display unit 107 to display the latest status of a print job. Furthermore, the control unit 1601 causes the progress status transmission unit 1609 to transmit, to the print server 20, job record management information stored in the job record storage unit 1608 and the progress status acquired by the progress status acquisition unit 1605.

In steps S1408 and S1415 of the second exemplary embodiment, the control unit 1301 determines whether any instruction (for example, cancel or reprint) is received via the operation unit 1303. In the third exemplary embodiment, the control unit 1601 determines whether any instruction (for example, cancel or reprint) is received via the operation unit 1603 and also determines whether any instruction (for example, cancel or reprint) is received from the print server 20 via the interface control unit 110.

As described above, the processing operation of the job management application B 1600 according to third exemplary embodiment is different from the processing operation of the job management application 1300 according to the second exemplary embodiment.

In the above-described third exemplary embodiment, both the image forming apparatus 10 and the print server 20 can perform the progress display of a print job and enables an operator to input any instruction (for example, cancel or reprint). However, if the job management application B 1600 does not include the display control unit 1602 and the operation unit 1603, the system can be modified so that only the image forming apparatus 10 performs the above-described processing.

As described above, the third exemplary embodiment can obtain various effects similar to those of the first exemplary embodiment. The job management processing can be separately performed by a plurality of apparatuses. Thus, the processing burden of each apparatus can be reduced.

The above-described first to third exemplary embodiments perform the detection of boundaries (breakpoints) of records in the content analysis of a PPML file based on a repetition pattern of reusable data and variable data. If two or more document tags are present in a PPML file, these document tags can be used to detect the boundaries of records. For example, it is useful to provisionally determine boundaries of records according to document tags and detect the boundaries of records based on a repetition pattern of reusable data or variable data in respective documents.

An application installed on the client PC 40 that generates a print job of a variable print can be configured to add, to records, a comment indicating boundaries (breakpoints) of records. Exemplary processing for adding a comment for each record is described below with reference to FIG. 18.

Figure 18:
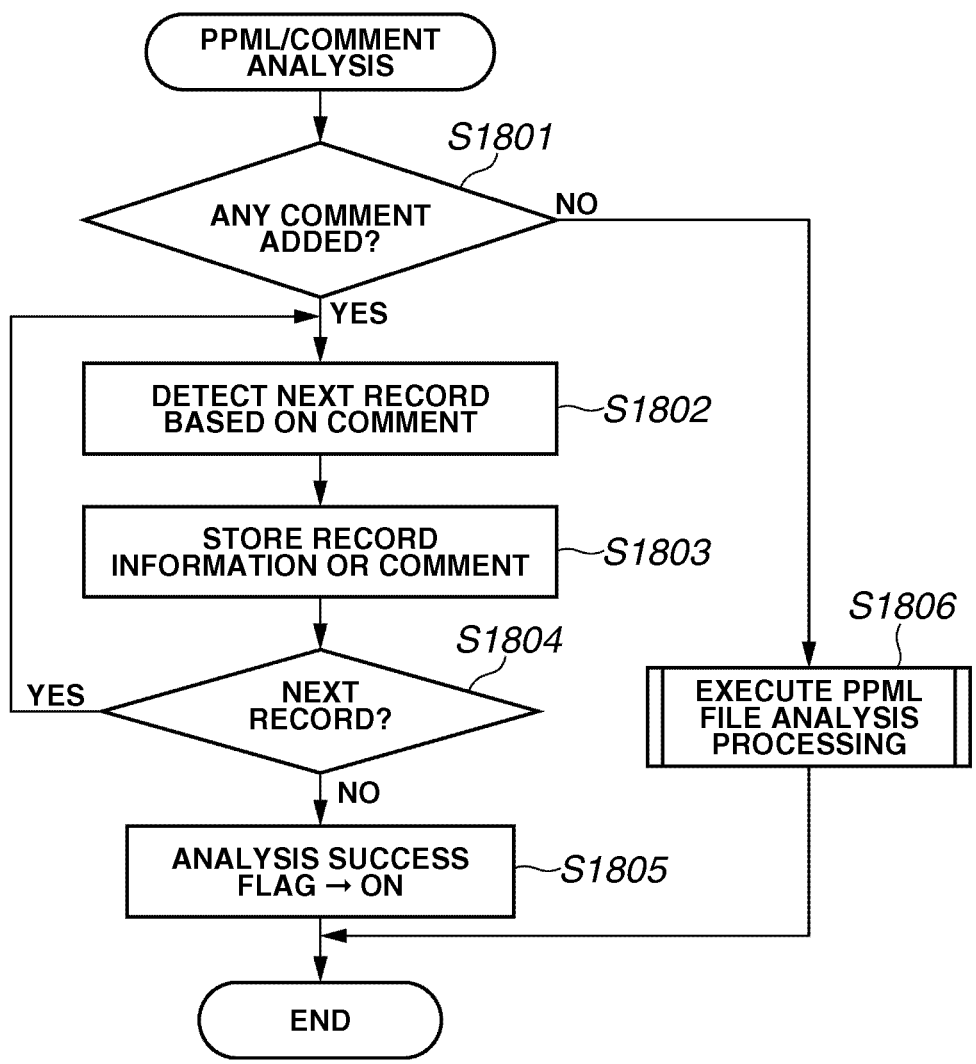
FIG. 18 is a flowchart illustrating an example of job analysis processing capable of processing a record to which a comment is added.

FIG. 18 is a flowchart illustrating job analysis processing that can process each record to which a comment is added. The job analysis processing illustrated in FIG. 18 is comparable to the PPML file analysis processing illustrated in FIG. 6 performed in step S504 illustrated in FIG. 5A or in step S1404 illustrated in FIG. 14A.

In step S1801, the job analysis unit analyzes the content of a PPML file and determines whether a comment indicating boundaries (breakpoints) of records is present. As described above, an application operating on the client PC 40 to generate a print job of a variable print can add the comment indicating the boundaries of records.

If the job analysis unit determines that the comment indicating the boundaries of records is added (YES in step S1801), the processing proceeds to step S1802. If the job analysis unit determines that the comment indicating the boundaries of records is not added (NO in step S1801), the processing proceeds to step S1806. In step S1806, the job analysis unit performs the PPML file analysis processing described in FIG. 6 and terminates the job analysis processing.

In step S1802, the job analysis unit detects the next record based on the added comment.

In step S1803, the job analysis unit stores record information (e.g., record number, number of pages, and variable data) of the record as job record management information illustrated in FIG. 9. In this case, the job analysis unit can store the comment added to each record as job record management information. The stored comment can be displayed as record information when a progress display is performed.

In step S1804, the job analysis unit determines whether there is the next record. If the job analysis unit determines that there is the next record (YES in step S1804), the processing returns to step S1802. If the job analysis unit determines that there is not any record (NO in step S1804), the processing proceeds to step S1805. In step S1805, the job analysis unit sets the analysis success flag to ON and terminates the job analysis processing.

In the above-described exemplary embodiments, a print job of a variable print (i.e., a job analysis object) is a PPML file. However, the present invention is not limited to the above-described exemplary embodiments and can be applied to any other file described using another description language.

The present invention can manage each record in association with a print page in a print job relating to a variable print. Thus, the present invention can manage a print job on a record-by-record basis and can improve usability.

Figure 20:
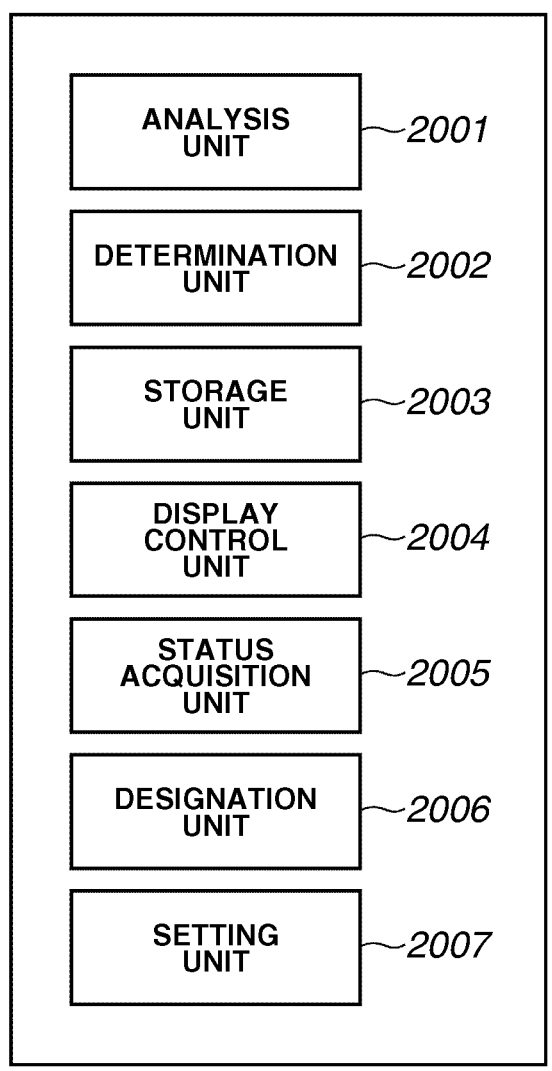
FIG. 20 is an example of a function block diagram of an information processing apparatus according to an exemplary embodiment of the present invention.

FIG. 20 is a function block diagram of the information processing apparatus according to an exemplary embodiment of the present invention.

An analysis unit 2001 analyzes a print job generated based on a plurality of records. A determination unit 2002 detects a boundary or boundaries of records based on the result of analysis acquired by the analysis unit 2001 and determines a respective print page corresponding to each respective record. Thus, each record has a respective print page that corresponds to it.

A storage unit 2003 stores each record of the print job and its respective print page while associating them with each other according to content determined by the determination unit 2002.

A display control unit 2004 causes a display device to display a state of the print job on a record-by-record basis, using the respective print page corresponding to each respective record stored in the storage unit 2003.

A status acquisition unit 2005 acquires a state of the print job from an image forming apparatus that performs print processing based on the print job. A designation unit 2006 designates a record as a print range of print processing performed by a printing apparatus. A setting unit 2007 sets a print page corresponding to the record designated by the designation unit 2006 as the print range.

Other Exemplary Embodiments

Furthermore, software program code for realizing the functions of the above-described exemplary embodiments can be supplied to a system or an apparatus including a one or more devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code with support of executing hardware realizes the functions of the exemplary embodiments. The equivalents of programs can be used if they possess comparable functions. In this case, the type of program can be any one of object code, interpreter program, and OS script data. Furthermore, the present invention encompasses supplying program code to a computer with a storage (or recording) medium storing the program code. A storage medium supplying the program can be selected, for example, from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. Authorized users (users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or the whole of actual processing based on instructions of the programs. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-110955 filed Apr. 19, 2007, which is hereby incorporated by reference herein in its entirety.

What is claimed is:

1. An information processing apparatus comprising:
   a first analysis unit configured to detect reference instruction of reusable data by analyzing a print job generated based on a plurality of records, wherein the reusable data is commonly used for the plurality of records;
   a first determination unit configured to provisionally determine breakpoints of the records based on repetition cycles of the reference instruction of the reusable data detected by the first analysis unit;
   a second analysis unit configured to detect type and drawing position of variable data;
   a second determination unit configured to determine boundaries of the records based on the breakpoints provisionally determined by the first determination unit and the type and drawing position of the variable data detected by the second analysis unit;
   a storing unit configured to store the boundaries of the records determined by the second determination unit;
   a transmission unit configured to transmit the print job to an image forming apparatus that performs print processing based on the print job;
   a status acquisition unit configured to acquire a state of the print job from the image forming apparatus; and
   a display control unit configured to cause a display device to display a progress status of the print job on a record-by-record basis based on the boundaries of the records stored by the storing unit and the state of the print job acquired by the status acquisition unit.

2. The information processing apparatus according to claim 1, wherein the second determination unit determines the boundaries of the records by determining whether the type and drawing position of the variable data are similar between page ranges segmented according to the provisionally determined breakpoints.

3. The information processing apparatus according to claim 1, further comprising a setting unit configured to enable an operator to set whether or not a record-by-record basis management of the print job is performed, wherein the processes of the first analysis unit, the first determination unit, the second analysis unit, the second determination unit, the storing unit, the transmission unit, the status acquisition unit and the display control unit are executed if the setting unit set that the record-by-record basis management is performed.

4. A method for controlling an information processing apparatus, the method comprising:
   detecting, in a first analysis step, reference instruction of reusable data by analyzing a print job generated based on a plurality of records, wherein the reusable data is commonly used for the plurality of records;
   provisionally determining, in a first determination step, breakpoints of the records based on repetition cycles of the reference instruction of the reusable data detected in the first analysis step;
   detecting, in a second analysis step, type and drawing position of variable data;
   determining, in a second determination step, boundaries of the records based on the breakpoints provisionally determined in the first determination step and the type and drawing position of the variable data detected in the second analysis step;
   storing, in a storing step, the boundaries of the records determined in the second determination step;
   transmitting, in a transmission step, the print job to an image forming apparatus that performs print processing based on the print job;
   acquiring, in a status acquisition step, a state of the print job from the image forming apparatus; and
   causing, in a display control step, a display device to display a progress status of the print job on a record-by-record basis based on the boundaries of the records stored in the storing step and the state of the print job acquired in the status acquisition step.

5. The method according to claim 4, further comprising determining in the second determination step the boundaries of the records by determining whether the type and drawing position of the variable data are similar between page ranges segmented according to the provisionally determined breakpoints.

6. The method according to claim 4, further comprising enabling an operator to set a setting as to whether or not a record-by-record basis management of the print job is performed, wherein the processes of the first analysis step, the first determination step, the second analysis step, the second determination step, the storing step, the transmission step, the status acquisition step and the display control step are executed if the setting indicates that the record-by-record basis management is performed.

7. A non-transitory computer readable medium containing computer-executable instructions for an information processing apparatus, the computer-executable instructions comprising:
   computer-executable instructions for detecting, in a first analysis step, reference instruction of reusable data by analyzing a print job generated based on a plurality of records, wherein the reusable data is commonly used for the plurality of records;
   computer-executable instructions for provisionally determining, in a first determination step, breakpoints of the records based on repetition cycles of the reference instruction of the reusable data detected in the first analysis step;
   computer-executable instructions for detecting, in a second analysis step, type and drawing position of variable data;
   computer-executable instructions for determining, in a second determination step, boundaries of the records based on the breakpoints provisionally determined in the first determination step and the type and drawing position of the variable data detected in the second analysis step;
   computer-executable instructions for storing, in a storing step, the boundaries of the records determined in the second determination step;

computer-executable instructions for transmitting, in a transmission step, the print job to an image forming apparatus that performs print processing based on the print job;

computer-executable instructions for acquiring, in a status acquisition step, a state of the print job from the image forming apparatus; and computer-executable instructions for causing, in a display control step, a display device to display a progress status of the print job on a record-by-record basis based on the boundaries of the records stored in the storing step and the state of the print job acquired in the status acquisition step.

8. The non-transitory computer readable medium according to claim 7, wherein the computer-executable instructions comprise computer-executable instructions for determining in the second determination step the boundaries of the records by determining whether the type and drawing position of the variable data are similar between page ranges segmented according to the provisionally determined breakpoints.

9. The non-transitory computer readable medium according to claim 7, wherein the computer-executable instructions comprise computer-executable instructions for enabling an operator to set a setting as to whether or not a record-by-record basis management of the print job is performed, wherein the processes of the first analysis step, the first determination step, the second analysis step, the second determination step, the storing step, the transmission step, the status acquisition step and the display control step are executed if the setting indicates that the record-by-record basis management is performed.

\* \* \* \* \*